United States Patent [19]
Knowlton

[11] Patent Number: 5,754,707
[45] Date of Patent: May 19, 1998

[54] IMAGE UNDITHERING APPARATUS AND METHOD

[75] Inventor: Kenneth C. Knowlton, Merrimack, Mass.

[73] Assignee: Kodak Limited, Harrow, England

[21] Appl. No.: 123,578

[22] Filed: Sep. 17, 1993

Related U.S. Application Data

[63] Continuation of Ser. No. 849,637, Mar. 5, 1992, abandoned, which is a continuation of Ser. No. 639,465, Jan. 10, 1991, abandoned.

[51] Int. Cl.$^6$ ..................................................... G06K 9/40
[52] U.S. Cl. ........................... 382/254; 382/217; 358/457
[58] Field of Search .......................... 382/48, 50, 54, 382/52, 181, 217, 218, 254, 282; 358/455, 456, 457, 460, 462

[56] References Cited

U.S. PATENT DOCUMENTS

| | | | |
|---|---|---|---|
| 3,977,007 | 8/1976 | Berry et al. | 358/456 |
| 4,339,774 | 7/1982 | Temple | 358/456 |
| 4,486,785 | 12/1984 | Lasher et al. | 358/455 |
| 4,722,008 | 1/1988 | Ibaraki et al. | 358/283 |
| 4,783,838 | 11/1988 | Matsunawa | 382/51 |
| 4,858,018 | 8/1989 | Tanaka | 358/456 |
| 4,903,142 | 2/1990 | Hasebe et al. | 358/457 |
| 4,905,097 | 2/1990 | Watanabe et al. | 358/455 |
| 4,926,268 | 5/1990 | Kawamura et al. | 358/456 |
| 5,018,024 | 5/1991 | Tanioka | 358/457 |
| 5,027,078 | 6/1991 | Fan | 358/456 |

FOREIGN PATENT DOCUMENTS

| | | |
|---|---|---|
| 0 207 548 A1 | 1/1987 | European Pat. Off. . |
| 0 389 743 A2 | 10/1990 | European Pat. Off. . |
| 0 422 588 A2 | 4/1991 | European Pat. Off. . |
| 2 141 898 | 1/1985 | United Kingdom . |

*Primary Examiner*—Leo Boudreau
*Assistant Examiner*—Phuoc Tran
*Attorney, Agent, or Firm*—Nelson Adrian Blish; Gary D. Clapp

[57] ABSTRACT

A method enables a dithered representation of an image to be converted to a continuous tone representation of the image. This undithering method compares the regions of dithered representation with sections of dither patterns to determine an appropriate continuous tone representation from which the dithered image could have resulted. When the continuous tone representation is found the region is converted into a continuous tone representation. This procedure may be spatially iterated on a pixel by pixel basis until all of the initial representation of the image is converted into a continuous tone representation. The procedure may also be modified to account for line art. Furthermore, the procedure may be applied to produce adjustments in the size of the picture including miniaturizations and enlargements of the original image. In accordance with this application, dithered portions of the original image are redithered in a manner to produce a alternative size output image. Similarly line art portions of the original image are treated as grey scale values and redithered to produce the alternative size representations of the line art.

11 Claims, 20 Drawing Sheets

FIG. 5

| GREY SCALE LEVEL | | | | | | | | | | | | | | | | |
|---|---|---|---|---|---|---|---|---|---|---|---|---|---|---|---|---|
| 0) | 000 | | | | | | | | | | | | | | | |
| 1) | 000 | 001 | 002 | 400 | 800 | 200 | 040 | 020 | 004 | 080 | 100 | 008 | 010 | | | |
| 2) | | | | | 201 | 042 | 420 | 804 | 280 | 028 | 140 | 014 | 081 | 408 | 102 | 810 |
| 3) | 281 | 142 | 428 | 814 | 201 | 042 | 420 | 804 | 280 | 028 | 140 | 014 | 081 | 408 | 102 | 810 |
| 4) | 281 | 142 | 428 | 814 | | | | | | | | | | | | |
| 5) | 281 | 142 | 428 | 814 | 291 | 528 | 14A | 894 | 42A | A81 | 162 | A14 | 285 | 468 | 815 | 542 |
| 6) | 46A | A85 | 562 | A15 | 291 | 528 | 14A | 894 | | | | | | | | |
| 7) | 46A | A85 | 562 | A15 | A95 | 56A | | | A91 | 52A | A94 | 16A | 568 | 295 | 54A | 895 |
| 8) | | | | | A95 | 56A | | | | | | | | | | |
| 9) | A9D | 57A | 5EA | B95 | A95 | 56A | AB5 | 56E | 56B | A97 | E95 | D6A | 76A | AD5 | | |
| 10) | A9D | 57A | 5EA | B95 | EB5 | D6E | 76B | AD7 | | | | | | | | |
| 11) | EBD | 7EB | D7E | BD7 | EB5 | D6E | 76B | AD7 | E9D | D7A | 7EA | BD5 | ABD | 57E | 5EB | B97 |
| 12) | EBD | 7EB | D7E | BD7 | FBD | 7FB | DFE | BDF | | | | | | | | |
| 13) | EBD | 7EB | D7E | BD7 | FBD | 7FB | DFE | BDF | D7F | EBF | FEB | F7E | BF7 | EFD | 7EF | |
| 14) | | | | | FBD | 7FB | DFE | BDF | EFF | FEF | F7F | FF7 | | | | |
| 15) | FFF | FFE | FFD | BFF | 7FF | FBF | FFB | DFF | FDF | EFF | FEF | F7F | FF7 | | | |
| 16) | FFF | | | | | | | | | | | | | | | |

GREY SCALE -LEVEL 1

0) 000

000 001 002 400 800 200 040 020 004

2) 
201 042 420 804 080 100 008 010
201 042 420 804 280 028 140 014 081 408 102 810
                              080 100 008 010

4) 281 142 428 814
   281 142 428 814
   281 142 428 814

6) 46A A85 562 A15   291 528 14A 894   42A A81 162 A14 285 468 815 542
   46A A85 562 A15   291 528 14A 894
                     A91 52A A94 16A 568 295 54A 895

8) A95 56A
   A95 56A
   A95 56A

10) A90 57A 5EA B95   AB5 56E 76B AD7
    A90 57A 5EA B95   EB5 D6E 76B AD7
                      EB5 D6E 76B AD7   AB5 56B A97 E95 D6A 76A AD5

12) EBD 7EB D7E BD7
    EBD 7EB D7E BD7
    EBD 7EB D7E BD7   E9D D7A 7EA BD5 ABD 57E 5EB B97

14) FBD 7FB DFE BDF
    FBD 7FB DFE BDF
                FBF FFB DFF FDF   FBD 7FB DFE BDF D7F FD7 EBF FEB F7E BF7 EFD 7EF
                                                            EFF FEF F7F FF7
                                                            EFF FEF F7F FF7

16) FFF FFE FFD BFF 7FF
    FFF

FIG. 6

| GREY SCALE LEVEL | | | | | | | | | |
|---|---|---|---|---|---|---|---|---|---|
| 0) | 000 | 001 | 002 | 400 | 800 | 200 | 040 | 020 | 004 |
| 2) | 201 | 042 | 420 | 804 | 080 | 100 | 008 | 010 | 280 | 028 | 140 | 014 | 081 | 408 | 102 | 810 |
| 4) | 281 | 142 | 428 | 814 | 42A | A81 | 162 | A14 | 285 | 468 | 815 | 542 |
| 6) | 46A | A85 | 562 | A15 | 291 | 528 | 14A | 894 | A91 | 52A | A94 | 16A | 568 | 295 | 54A | 895 |
| 8) | A95 | 56A |
| 10 | A9D | 57A | 5EA | B95 | EB5 | D6E | 768 | AD7 | AB5 | 56E | 56B | A97 | E95 | D6A | 76A | AD5 |
| 12) | EBD | 7EB | D7E | BD7 | E9D | D7A | 7EA | BD5 | ABD | 57E | 5EB | B97 |
| 14) | FBD | 7FB | DFE | BDF | EFF | FEF | F7F | FF7 | D7F | FD7 | EBF | EB7 | FEB | F7E | BF7 | 7EF |
| 16) | FFF | FFE | FFD | BFF | 7FF | FBF | FFB | DFF | FDF |

FIG. 7

280 IN HEX
IMPLIES LEVEL 2

140 IN HEX
IMPLIES LEVEL 2

LINE ART                                    # = BLACK
                                            O = WHITE

HEX = 101              HEX = F66              HEX = 000
1 BLACK INSIDE         1 BLACK INSIDE         INSIDE IS DEVOID
1 BLACK OUTSIDE        7 BLACK OUTSIDE        OF BLACK PIXELS
∴ OUTPUT = #           ∴ OUTPUT = O           ∴ OUTPUT = O

ASSUME P=1

HEX = 010
GREY SCALE VALUE ≅ 2

HEX = 804
GREY SCALE VALUE ≅ 2

LEVEL 2
DITHER PATTERN

IMAGE UNDITHERING APPARATUS AND METHOD

The present patent application is a continuation patent application of U.S. patent application Ser. No. 07/849,637 for IMAGE UNDITHERING APPARATUS AND METHOD by Kenneth C. Knowlton, filed Mar. 5, 1992, abandoned, which is a continuation of patent application Ser. No. 07/639,465, filed Jan. 10, 1991, abandoned.

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND OF THE INVENTION

In discretely quantized continuous tone pictures, each pixel assumes a tone selected from a specified scale of tones. Typically, each tone is assigned a discrete value that uniquely identifies the tone. The tone of each pixel may, thus, be characterized by its corresponding discrete value. This discrete value is known as the pixel value. The use of pixel values may be illustrated by looking at a sample scale such as the grey scale which ranges from white to black. In a 17 level grey scale, the possible pixel values may run from 0 indicating pure white to 16 indicating pure black. The values 1 through 15 indicate successive degrees of darker grey pixels.

Often times it is difficult for display devices to display such continuous tone pixels, for many devices are limited to displaying only white and black pixels. Such devices, therefore, use spatial dithering or digital half-toning to provide the illusion of continuous tone pictures (hereinafter this process shall be referred to as dithering). Dithering uses only black and white pixels to provide the illusion of a continuous tone picture. Specifically, it intermixes the black and white pixels in a predetermined manner to simulate various tones of grey. Two well known dithering approaches are clustered-dot ordered dithering and dispersed-dot ordered dithering (sometimes referred to as scattered dot dithering).

Both of these dithering strategies are classified as order dither algorithms. They rely on a deterministic periodic threshold array for converting a continuous tone image into a dithered image. These types of dithering algorithms are referred to as "ordered" rather than "random" algorithms because the thresholds in the array are organized and applied in an ordered sequence. In dispersed dot dithering, the resulting output is comprised of dispersed dots, whereas clustered dot dithering the resulting output is comprised of clusters of dots. More information on dithering can be found in Limb, J. O., "Design of dither waveforms for quanitized visual signals," *Bell Sys. Tech. J.*, Sep. 1969, pp. 2555–2582; Bayer, B. E., "An optimum method for rendition of continuous tone pictures," *Proc. IEEE Conf. Commun.*, (1973), pp. (26–11)-(26–15); and Knowlton, K. and Harmon, L., "Computer produced grey scales," *Computer Graphics and Image Proc.*, vol. 1 (1972), pp. 1–20.

An example of a dispersed dot threshold array is:

| 1  | 13 | 4  | 16 |
|----|----|----|----|
| 9  | 5  | 12 | 8  |
| 3  | 15 | 2  | 14 |
| 11 | 7  | 10 | 6  |

In applying such a threshold array to a continuous tone image, the array or grid of threshold numbers is overlayed repeatedly on the pixels of the quanitized continuous tone image in both the horizontal and vertical directions. Each pixel in the image is then compared with the corresponding grid threshold value that overlays it. If the grey scale pixel value equals or exceeds the corresponding grid threshold value, the resulting output dithered pixel is a black pixel. In contrast, if the grey scale value of the pixel is less than the corresponding grid threshold value, the resulting output dithered pixel is a white pixel.

As an illustration of how the above threshold array is used, assume that the array is placed over a group of pixels in a grey scale picture. For the pixel that underlies the threshold value in the upper left hand corner of the grid, the pixel must have a value of 1 or more in order to produce a dithered black pixel. Otherwise, a dithered white pixel is produced. Similarly, the next pixel to the right in the grey scale picture must have a value of 13 or greater in order to produce a dithered black pixel. The grid is applied to consecutive groups of pixels in the grey scale picture, i.e., across rows and columns of the pixels, until all of the rows and columns of the image have been successfully dithered.

The dither threshold array shown above is one of many different possible threshold arrays and is purely illustrative. The grid could equally as well have a lowest level of 0 rather than 1. Furthermore, grids of different sizes may be used. For example, 8×8 grids are often used.

SUMMARY OF THE INVENTION

The present invention converts a dithered representation of an image to a continuous tone representation of the image by comparing regions of the dithered representation of the image with predetermined patterns of pixels. The predetermined patterns of pixels identify possible continuous tone representations from which the regions of the dithered representation could have originated. An example of the type of patterns that are used for such a comparision is a dispersed dot dither pattern. The comparision yields at least one corresponding continuous tone representation from which the dither pattern could have originated. In accordance with the method, once the corresponding continuous tone representation is selected, a corresponding continuous tone representation is assigned to the respective region of the dithered representation. Preferably the assignment proceeds on a pixel by pixel basis. This method may be readily performed by a data processing system.

The method need not be limited purely to dithered representations; rather it may be modified so as to operate for pictures that are comprised of both dithered regions and line art regions. Line art refers to black letters, lines or shapes on a white background or white letters, lines or shapes on a black background. In view of the modification, the method proceeds as previously described except that when line art is encountered, the line art is not converted into a continuous tone representation. Instead, the line art is left alone so that the resulting image duplicates the input image for the regions that are deemed as line art.

One useful approach for comparing subject regions to the predetermined pixel patterns is to define a window of pixels in which a windowed sample of pixels from a source dithered image lie. This windowed sample of pixels is then compared as described above to yield a corresponding continuous tone representation of the source pixels in the window. The window may then be shifted to obtain a new windowed sample of pixels. Preferably, the window is shifted from one end to an opposite end across each of a series of lines of the image, such as in a left to right fashion until all pixels have been examined. By adopting this approach, the window may be moved across the entire source (i.e. dithered) representation of the image to grab successive windowed samples and, thus, convert the entire input image into an appropriate continuous tone output. Preferably the window is substantially t-shaped. Such a window works particularly well for a 17 level grey scale continuous tone representation.

In accordance with one embodiment, the determination of whether a portion of an image is dithered is performed by encoding pixels in the windowed sample of the image as a string of bits. Once they are encoded, the string of bits can be compared with small spatial pixel patterns held in memory as encoded bits to determine if the pixels of the image match the pixels held in memory. If such a match does occur, it is presumed that a portion of the image is dithered and the portion is designated as such.

The present invention also embodies a simpler method of determining whether a region of a picture is dithered. In particular, the region is examined to determine whether all the white pixels in the region are disconnected (i.e., it has no orthogonal white neighbors). If the pixels are disconnected, each white pixel has only black pixels as orthogonally adjacent neighbors. Similarly the same approach is adopted for each black pixel in the region. If either the white pixels or the black pixels are all disconnected, the region is deemed to be dithered. Otherwise, the region is deemed to be not dithered.

In accordance with the present invention, an additional method generates a pixel in a reduced size version of an original image. The additional method compares a source region of the image to dither patterns such as previously described to designate if the source region is dithered. The source region is comprised of an inner subregion and a surrounding outer subregion. If the source region is designated as dithered, the inner subregion of the source region is redithered to generate a single pixel value, wherein the inner subregion is viewed as a single pixel having a grey scale value assigned to the source region. This redithering results in a reduced size version of the source region. On the other hand, if the source region is designated as not dithered, the inner subregion is compared with the outer subregion, and a pixel having a value based on the number of black pixels in the outer subregion relative to the number of black pixels in the inner subregion is generated. Preferably, the inner subregion is comprised of 4 pixels and the outer region is comprised of 8 pixels that surround the inner subregion (for a 17 level grey scale). Such a source region results in a miniaturization that is linearly half as large as the original image. The method can be used iteratively to produce reduced sized versions of the original image which are reduced in size linearly four times, eight times, etc.

The above described methods may be implemented in a data processing system comprising a digital processor and a memory. The memory may comprise a first table of grey scale values indexed by given pixel patterns. Alternatively, an associative memory may be used. The first table or associative memory preferably holds grey scale values for both dithered patterns and line art. The memory also holds a second table of dithered pixel patterns associated with predetermined grey scale values. A procedure executed by the processor accesses the first table to provide grey scale values for the designated dithered regions and then accesses the second table to obtain bits to be used for redithering.

If a reduction in the size of the original image is to be performed, the processor also redithers adjacent regions of the image according to the grey scale values in a manner such that a reduced size image (such as a shrunken icon image) is generated. This process does not explicitly branch for the line art or dithering case but rather operates as if uniformly redithering the image; the tables, however, are constructed so that for the line art case, the pixels are re-rendered in accordance with optimal treatment for line art.

The present invention is not limited to production of shrunken replicas of the original image. The shrunken replicas represent a specific instance of a broader method encompassed within the present invention. Specifically, the present invention includes a more general method of producing a replica of a source picture such that the replica is a different size than the source picture. The different size replica may be an enlargement or, alternatively, a reduction of the source picture.

In accordance with this approach, for each pixel in the replica, the source pixels which contribute to the pixel in the replica are identified. Next, a decision is made, by weighted voting, as to whether the destination pixel is to be considered as having come from line art or dithering. In accordance with that decision, for each line art destination pixel, a value of "black" or "white" is determined according to a weighted average of contributing source pixels. For each grey scale destination pixel, a grey scale value is determined for each contributing pixel in the source picture. Based on the respective contributions from pixels in the source picture and grey scale values of the contributing source pixels, a cumulative grey scale value is determined. This cumulative grey scale value is then associated with each grey scale pixel in the replica for redithering purposes. Utilizing the cumulative grey scale values, the source picture is dithered to produce the different size destination replica of the source picture.

As mentioned above, the replica may be smaller, larger or have a different aspect ratio than the source picture.

BRIEF DESCRIPTION OF THE DRAWINGS

FIG. 5 lists the hexadecimal patterns for the dither patterns associated with each of the 17 grey levels.

FIG. 6 is a consolidation of the digit patterns depicted in FIG. 5 such that there are only even numbered levels.

FIG. 7 depicts the digit patterns of FIG. 6 with redundancies removed.

FIGS. 14a, 14b and 14c illustrate sample window positions for a dithered region of an image.

DETAILED DESCRIPTION OF THE PREFERRED EMBODIMENT

The preferred embodiment of the present invention provides a means for approximate undithering of an image having dithered regions, that is it converts a source picture with dithered regions into a destination continuous tone (grey scale) picture. As such, it is an approximate reversal of the dithering process. It achieves the conversion on a pixel by pixel basis in an iterative fashion and suffers from statistically few errors. The source picture need not be a completely dithered picture; rather, it may be a picture wherein only portions are dithered. The present invention examines a portion of the source picture that may contain dithering to find an exact match with a portion of a uniformly grey dither result. If a match is found, it is presumed that the portion of the source picture is the product of dithering. Given this presumption, a selected pixel within the portion of the source picture currently being examined is converted into an appropriate destination grey scale pixel having an approximately correct grey scale value (i.e. the pixel is undithered). The approximate grey scale value is determined during the matching process by deciding which grey scale value could have produced the resulting portion of the source picture. If, on the other hand, there is no exact match, the corresponding pixel in the destination picture is given the current black or white state of the source pixel. All of the pixels are examined in such a manner until the entire source picture has been examined and converted.

Figure 1:
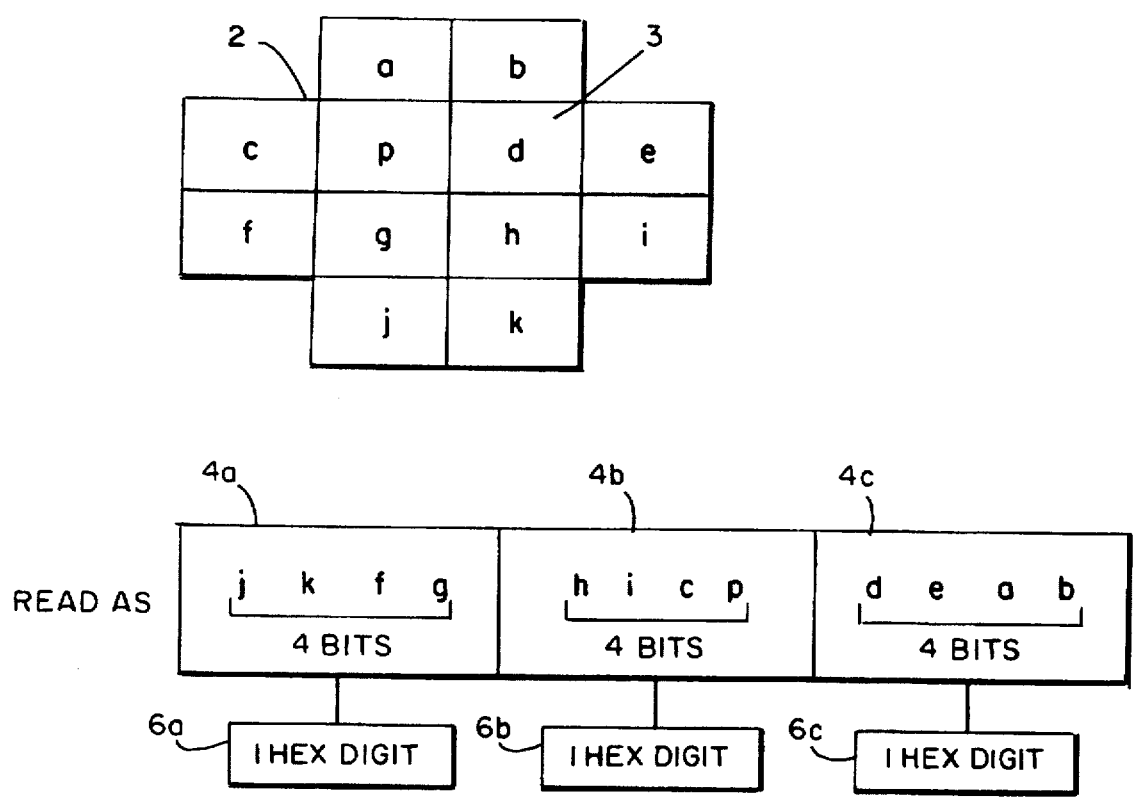
FIG. 1 illustrates a sample window pattern and how the pixels are read from the sample window.

The conversion process is performed by examining successive samples of the source picture. Each successive sample of the source picture is taken in a pattern that utilizes a window which defines the pixels currently being examined. The pixels within the window will be referred to hereinafter as a windowed sample. A suitable window 2 defining a windowed sample 3 in a dithered source picture is shown in FIG. 1. It should be appreciated that different window configurations may be utilized especially for grey scales having other than 17 levels.

The sample window configuration 2 shown in FIG. 1 works particularly well for a 17 level grey scale ranging from 0 denoting white to 16 denoting black. The use of this window configuration 2 will be illustrated for a picture comprised of black line art on a white background and dithered regions that have been dispersed dot dithered according to the 4×4 repeating threshold array given above in the Background section. The undithering works best with application to dispersed dot dithering because a smaller neighborhood of pixels suffices to identify a locality as dithering than required with other dithering techniques.

The windowed sample 3 in the window 2 shown in FIG. 1 is comprised of twelve pixels organized into a shape resembling a Greek cross. Each of the pixels in the windowed sample 3 is represented as a bit having a value of zero if it is white and a value of one if it is black. As can be seen in FIG. 1, eleven of these twelve pixels are denoted by letters ranging from "a" to "k". The remaining pixel is denoted by the letter "P". The pixel "P" identifies the source pixel in the sample that is converted into a destination continuous tone representation if a match is found (as discussed below). Hence, the entire pattern of pixels in the windowed sample 3 is examined for determining whether a match with a dither product exists, but only a single pixel in the windowed sample 3 is converted at a time. To simplify referencing of the bits in the windowed sample 3, the bits are referenced in a predefined order as shown in FIG. 1. In particular, the bits are referenced in four-bit chunks expressed in binary form as groups 4a, 4b and 4c. The first group 4a includes pixels "j", "k", "f", and "g" (in that order), whereas the second group 4b is comprised of pixels "h", "i", "c", and "P" (in that order). The third and final group 4c is comprised of pixels "d", "e", "a" and "b" (in that order). Each of these groups 4a, 4b and 4c may be more compactly referenced as a single hexadecimal digit 6a, 6b, 6c, respectively. As a result, the entire contents of the windowed sample may be referenced as three hexadecimal digits 6a, 6b and 6c. This particular referencing scheme is purely a matter of programming or notational preference. It is not a necessary element of the described method.

Figure 2:
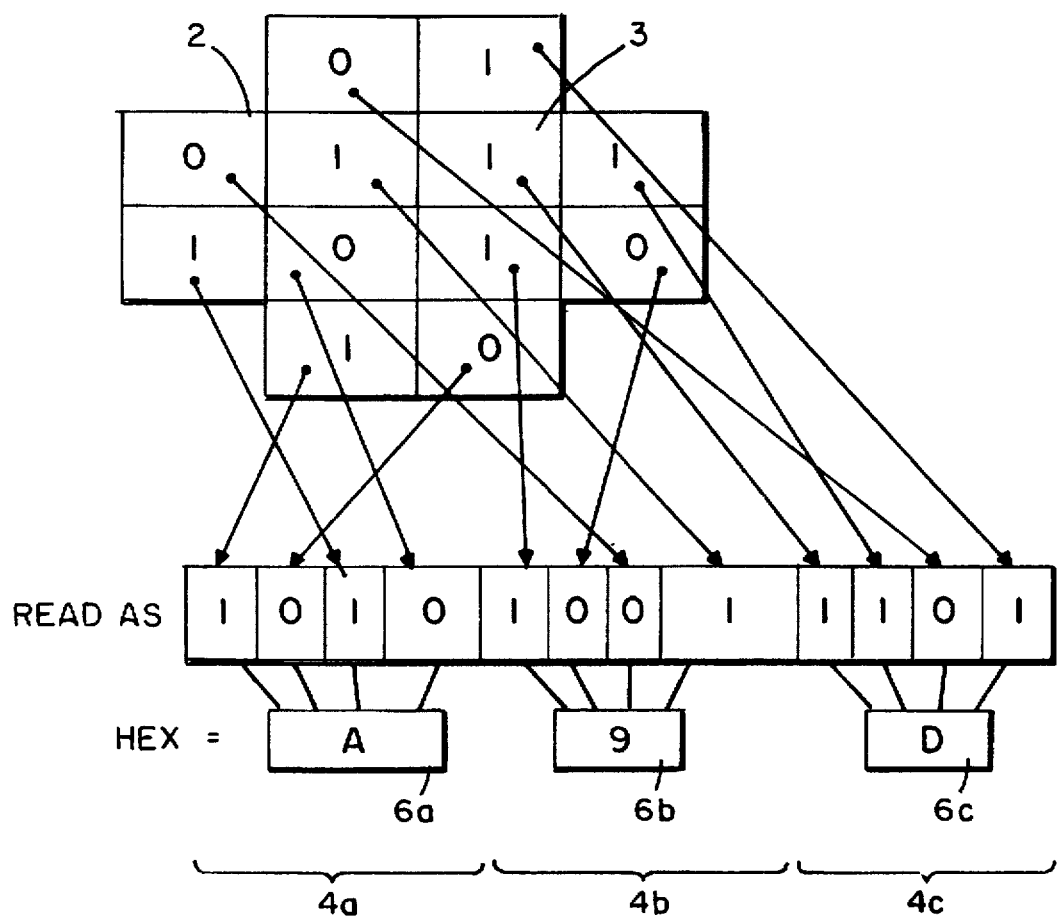
FIG. 2 depicts an example case of the sample window pattern of FIG. 1 and how the pattern may be referenced as binary digits or as hexadecimal digits.

An example of a windowed sample along with the corresponding bit pattern encoding the windowed sample is shown in FIG. 2. The windowed sample 3 is comprised of a series of data bits having values of either zero (indicating a white pixel) or one (indicating a black pixel). The windowed sample 3 shown in FIG. 2 is referenced as three groups of four bits each where the first group 4a equals "1010"; the second group 4b equals "1001"; and the third group 4c equals "1101". When the three groups 4a, 4b and 4c of four bits are referenced in hexadecimal notation, they are expressed as "A", "9" and "D", respectively, or when combined as "A9D".

Figure 3:
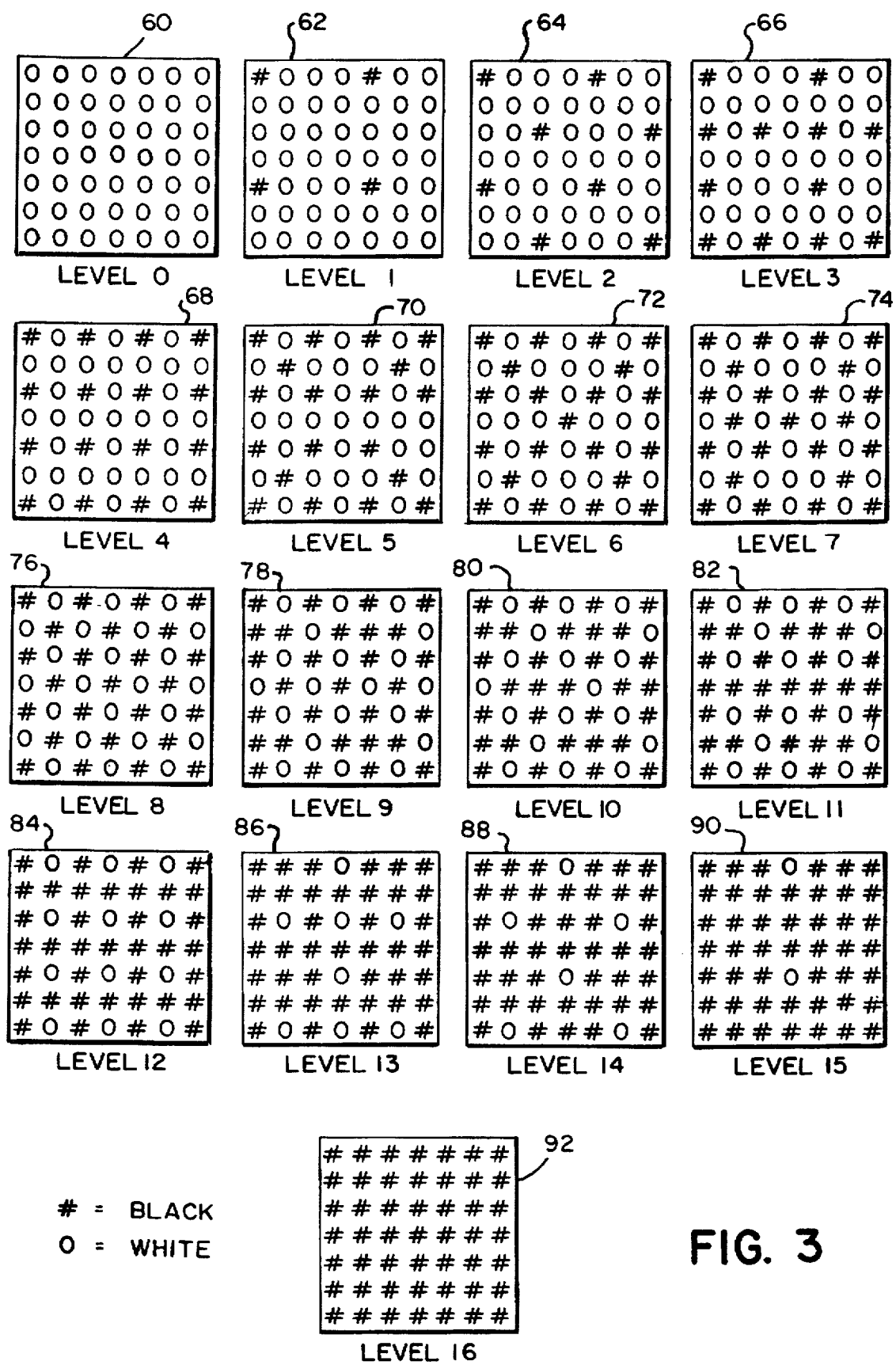
FIG. 3 illustrates the dither patterns of a 7×7 region for each level of a 17 level grey scale.

Given the above description, it must be considered how the window 2 is applied to the source picture. In particular, it must be considered in what sequence and where the sample window 2 is placed on the source picture. This issue is of particular importance because the relative position of the window on the dither pattern must be taken into account, for different sample window positions on a given dither pattern yield different pixel patterns. As an illustration, suppose that the sample window 2 is positioned within a 7 pixel by 7 pixel dithered region of a source picture. Since this 7×7 region is dithered, the region is made of a specific periodic pattern of pixels. The pattern of pixels is dictated by the grey scale values of an original region from which the dither pattern was produced. FIG. 3 depicts the 17 pixel patterns 60–92 produced when the 7×7 pixel region is dithered for locally uniform areas of the 17 levels of grey scale. Each dither pattern 60-92, shown in FIG. 3, is associated with a particular grey scale level value. The #'s indicate black pixels and the 0's indicate white pixels in FIG. 3. The patterns shown in FIG. 3 are those that result from applying the threshold array discussed in the Background section to the 7×7 region. As can be seen in FIG. 3, the level zero dither pattern is entirely white, and the level 16 pattern is entirely black. Moreover, the level 8 pattern is comprised of exactly half white pixels and half black pixels intermixed equally in a checkerboard pattern.

Figure 4:
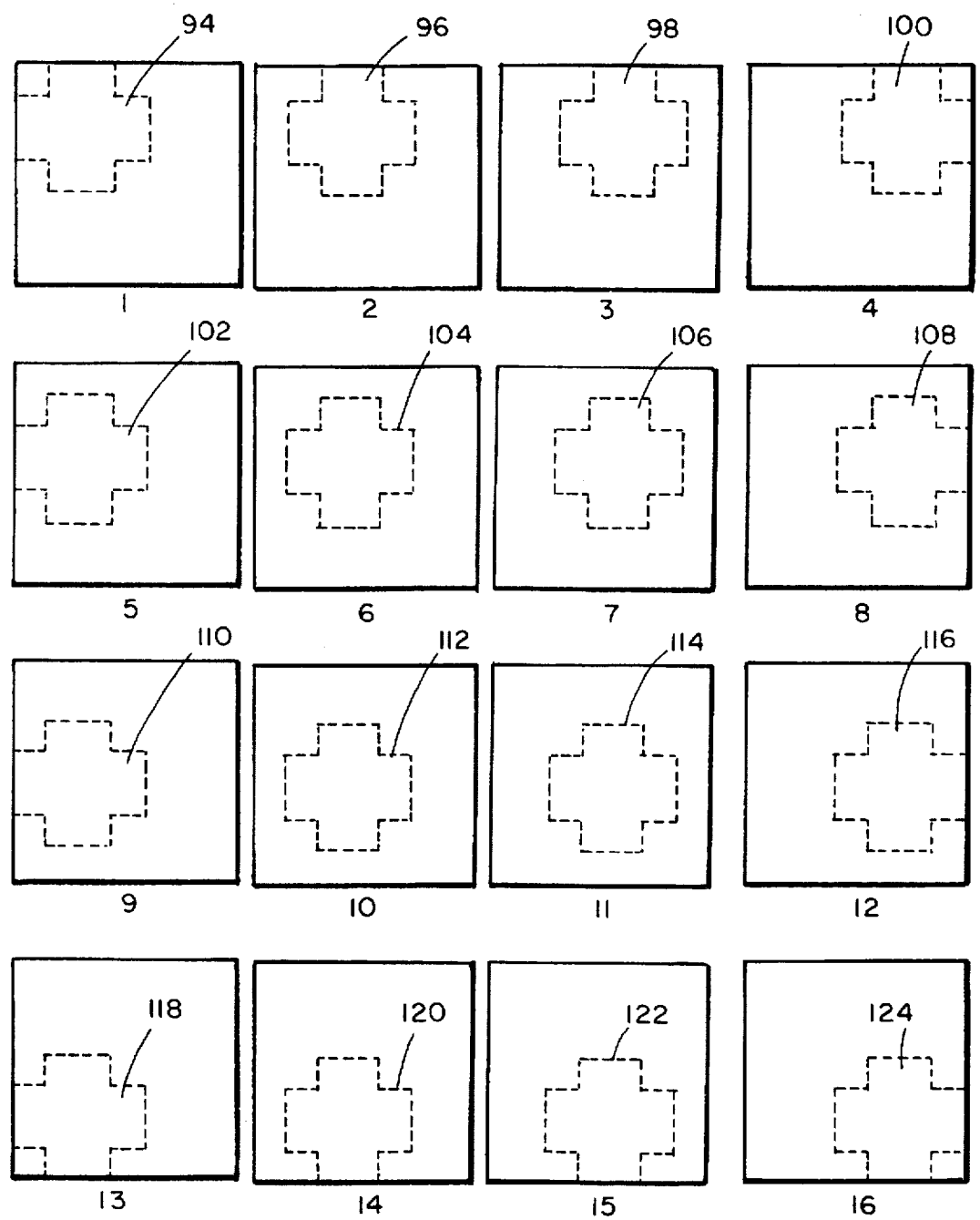
FIG. 4 depicts the 16 window positions that the sample window of FIG. 1 may assume within a 7×7 region.

For such a 7×7 region, the window 2 can fit into the region in 16 the different positions 94-124 that are illustrated in FIG. 4. As such, for any 7×7 region, the sample window 2 may capture as many as 16 distinct patterns for certain grey levels of dithering, one pattern for each window position in the 7×7 region. A larger sample, such as an 8×8 region is not used because the additional window patterns obtained with such a larger sample would be redundant with those obtained in the 7×7 region.

FIG. 5 shows, in table form, the different hexadecimal digit patterns that the respective sample window positions may yield for each of the different grey scale levels (indicated on the left-hand side of the table). Redundancy within given levels has been removed. It will be noted, for example, that the grey level having all zeroes which represents solid white yields only one window pattern (i.e. "000"), and the grey level having all ones which represents solid black yields only one window pattern (i.e. "FFF"), whereas the fine checkerboard of grey level 8 yields only two patterns "A95" and "56A" which differ in spatial phase. On the other hand, certain grey scale levels such as level 11 have sixteen different patterns (i.e. one for each window position). Some levels have fewer than sixteen different samples because the resultant dither pattern exhibits regularity.

It is apparent that there is a great deal of interpretative ambiguity between levels (i.e. different grey scale levels may be dithered such that the window patterns taken from the dither result of the different grey scale levels are the same), because the pixel that makes the difference between the given level and the next level is not caught by the window position. For instance, both a level 2 dither result and a level 3 dither result can generate a sample pattern encoded in hexadecimal digits as "201". One means of dealing with the ambiguity is to consolidate the dither patterns into half as many levels so that adjacent levels that would otherwise exhibit ambiguity are merged into a single level. One possible consolidation is shown in FIG. 6. In accordance with this grouping, the sample patterns for the odd numbered levels are merged into adjacent even numbered levels. For example, the first four sample patterns of level 3 are merged into interpretative level 4. The remaining 12 sample patterns of level 3, however, are merged into level 2. This merger provides a convenient way of resolving ambiguity while still producing satisfactory results. The interpretation chart of FIG. 6 may be further consolidated into that of FIG. 7 wherein each pattern appears only once.

The sixteen different sample window positions 94-124 (FIG. 4) within the 7×7 region are sufficient to obtain the various distinct samples that can be obtained by the window when applied to dither results. As such, the permutations shown in FIG. 7 represent all the possible sample patterns that may be obtained for dither results, provided that no more than one transition between levels traverses the windowed area. It is equally apparent that the sample window need not be applied strictly to 7×7 regions of a picture, but rather may be applied progressively from left to right across successive lines in a top to bottom fashion.

Figure 8A:
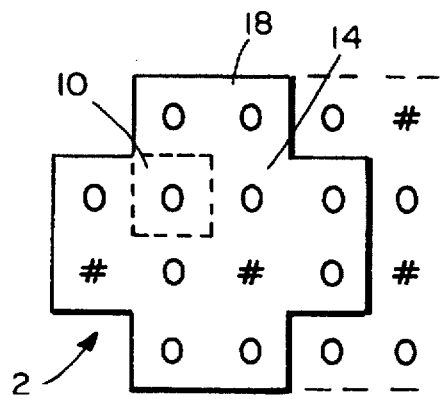
FIGS. 8a, 8b and 8c illustrate sample window positions and the corresponding output produced for the sample window positions.

An example of the positioning of the window 2 is shown in FIG. 8a where the window 2 is in window position 18. The source pixel P 10 (surrounded by a dotted box in FIG. 8a) is the pixel that is converted to a destination grey scale pixel. The windowed sample 3 shown in FIG. 8a may be expressed as "280" in hexadecimal notation according to the previously discussed scheme of FIG. 1. This value "280" is compared with the dithered pattern results. From FIG. 5, it is apparent that the pixel pattern is associated with a level 3 grey scale, however because of the consolidation, the pixel pattern is interpreted as originating from a level 2 grey scale. In particular, an examination of the table in FIG. 7 reveals that the "280" hexadecimal pattern is to be interpreted as a level 2 grey scale. Accordingly, to convert the source pixel 10 to a destination grey scale representation, a grey scale value of 2 is placed in the destination position 12 (FIG. 8c) corresponding with the source pixel 10.

Figure 8B:
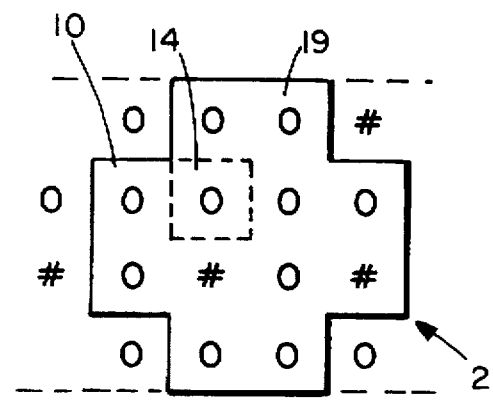
Figure 8C:
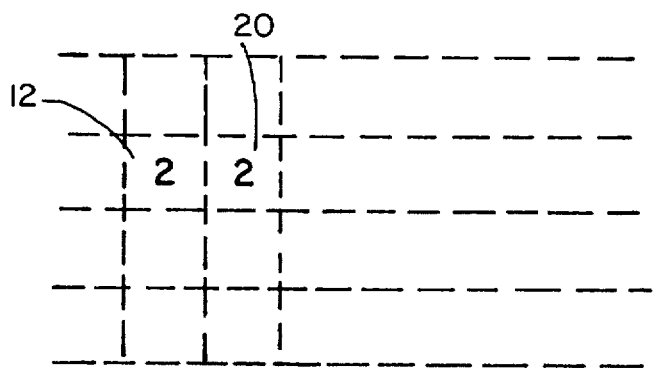

Since the first source pixel 10 has been converted, the window 2 is next moved over to the right by a single bit to window position 19 shown in FIG. 8b. As a result of the shifting of the sample window 2 to position 19, the pixel to be converted in the windowed sample 3 is now pixel 14 (surrounded by a dotted box in FIG. 8b). The new value for the windowed sample 3 is "140" in hexadecimal notation. The windowed sample 3 is interpreted as originating from a level 2 grey scale such as shown in FIG. 7. Accordingly, a grey scale value of 2 is placed in the destination position 20 that corresponds with the source pixel 14. In general, this process is repeated until all of the pixels in a source picture have been examined and converted, if necessary, (as mentioned previously, if the comparison of the sample pattern indicates no match with a dither result, the original pixel value becomes the value of the corresponding output pixel). If the entire source picture is dithered, an alternative approach may be adopted. Specifically, the percentage of black pixels to white pixels in the windowed sample 3 may be used to determine the grey scale value.

The major method described above for undithering performs quite well with minimal errors. The errors to which it is prone include erroneously interpreting line art as dithering. This variety of error occurs seldom because lines and text seldom result in speckled pixel arrays such as those that originate from dithering. Typically, these errors are noticeable only upon very meticulous scrutiny of the destination picture.

Another category of error that may occur is interpretation of dithering as line art. Such an error occurs with reasonable frequency. This type of error arises where the source grey scale picture exhibits spatially rapid change within the windowed samples, such as in the case of pixel patterns spanning more than one transistion between levels. (In general, a single grey scale level transition causes a sample to look like either a piece of the higher level or a piece of the lower level because at most one of the differentiating pixels is caught in the sample). The resulting pixel pattern in the windowed sample does not exhibit a stored dither pattern. Thus, the pixel pattern is treated as line art rather than dithering. The result of the error is to apply the line art method such as local contrast enhancement which may have the visual effect of edge sharpening. This effect is typically not deleterious.

Another error that may occur is properly recognizing line art as line art but producing black pixels in the destination picture where white pixels were desired. This variety of error does not occur frequently and, in any event, is a failure of the line art method employed (discussed later) as opposed to the undithering method.

A final error that may occur is to properly recognize dithering as dithering but to render the wrong grey scale values for pixels in the destination picture. This error occurs because of the consolidation and occurs quite often. Nevertheless, this error is not problematic because the resulting grey scale output is commonly only off by a single level.

A much simpler method for designating whether a source region is dithered is also embodied within the present invention. In accordance with this simpler method, samples are taken as described above with the sample window 2 (FIG. 1). However, instead of comparing the spatial pixel pattern of the windowed sample with dither patterns, the connectivity of the white or black pixels is examined. In particular, if either none of the white pixels, or none of the black pixels have like colored orthogonal neighbors, the pixel pattern is designated as a dither product of the grey level indicated by the percentage of black pixels in the windowed sample. This approach works only for dispersed dot dithering.

Figure 16B:
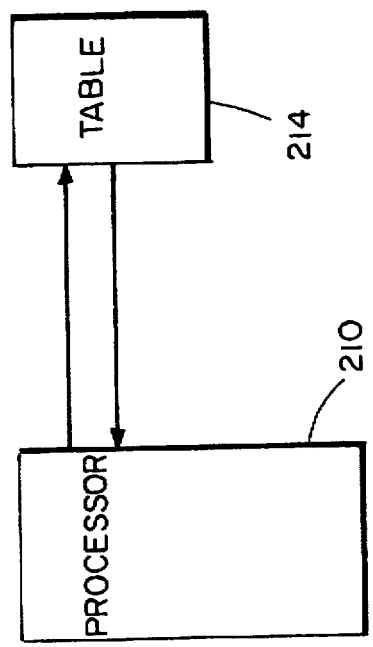
FIGS. 16a and 16b illustrate the basic components of the data processing system used to implement the undithering and shrinking procedures.
Figure 16A:
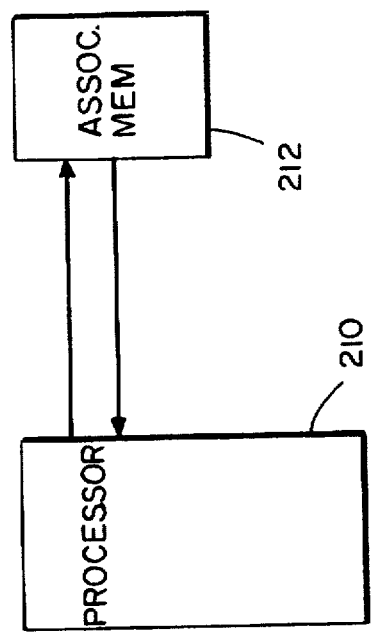

The undithering method may be readily implemented by a data processing system such as that shown in FIGS. 16a and 16b. The data processing system includes a processor 210 for executing procedures to perform the described method. The data processing system may also include an associative memory 212 such as shown in FIG. 16a to match sample patterns with dither result patterns. A table 214 (FIG. 16b) may, instead, be used to store the dither result patterns of FIGS. 5–7. In the table 214, the hexadecimal encoding of the windowed sample is used as an index value to look up a grey scale value.

The undithering method has uses in various picture processing operations. For such operations, better results can be achieved by working from earlier generation images or approximations of such earlier generation images. Undithering provides the capability to accurately approximate such earlier generation images. Examples of such picture processing operations include: conversion to cluster-dot dither for hard copy output, conversion to other than the original number of grey scale levels, conversion to different pixel aspect ratios, and operations such as edge detection, histogram leveling and contrast enhancement.

Figure 9:
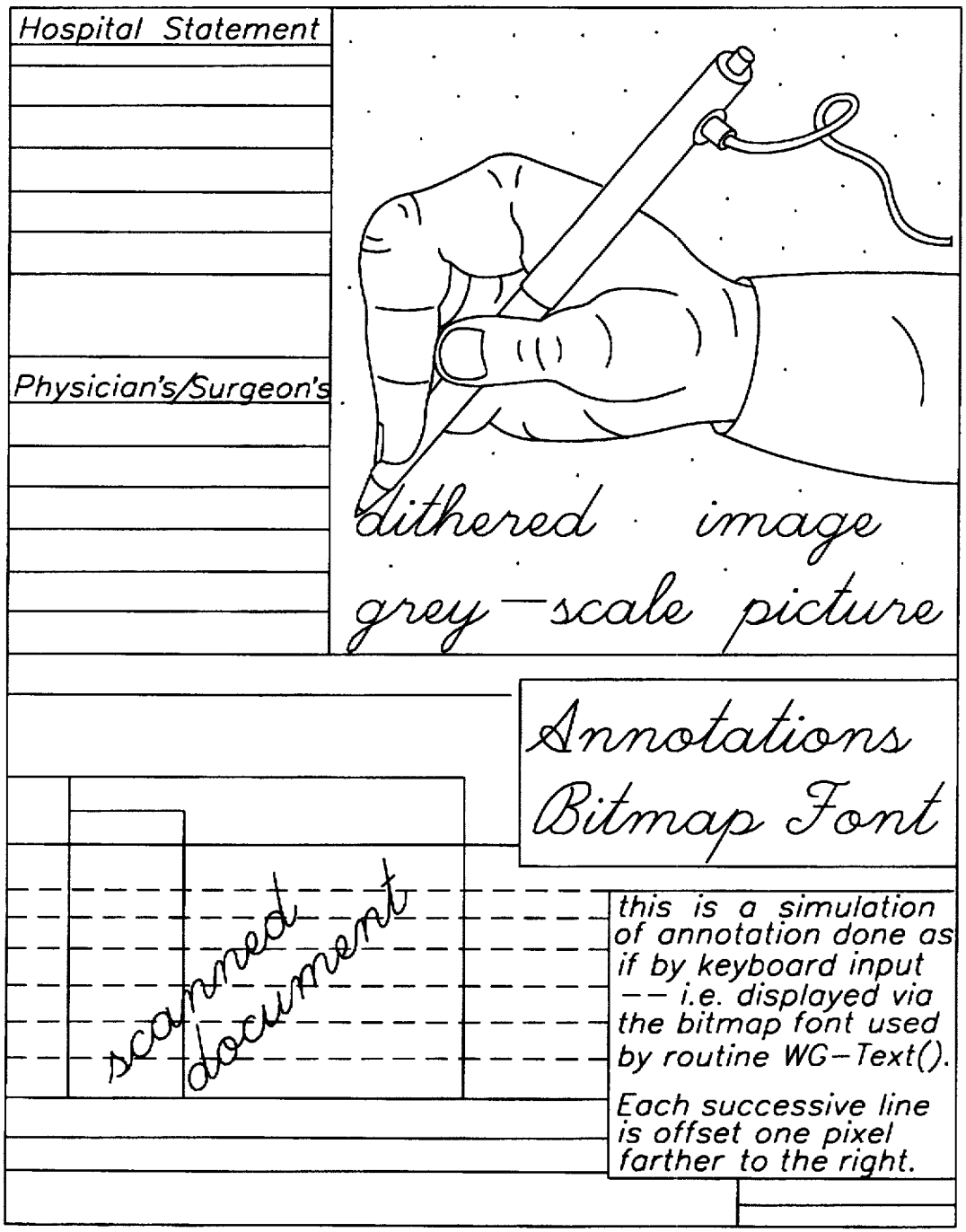
FIG. 9 is a picture comprised of line art and dithered regions.
Figure 10B:
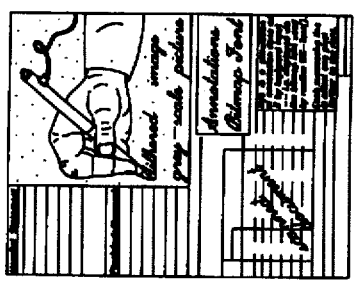
FIGS. 10a, 10b and 10c show shrunken versions of the FIG. 9 picture.
Figure 10C:
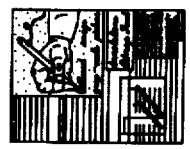
Figure 10A:
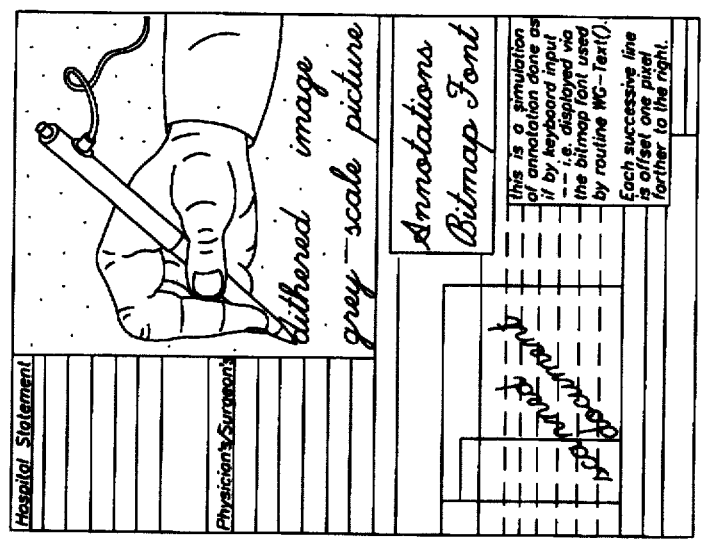

The above method and data processing system may also be utilized to produce alternative sized images of pictures or documents referred to hereinafter as stamps. This process of producing stamps is known as stamp making. For more information on stamps and stamp making see copending patent application Ser. No. 07/245,419, entitled "Document Manipulation in a Data Processing System". Only a few modifications need to be implemented relative to the above described method to enable the production of stamps. FIG. 9 illustrates a picture comprised of both line art and dithered images. By adopting the stamp-generating approach of the present invention, a half-sized stamp such as that shown in FIG. 10a, a quarter-sized stamp such as that shown in FIG. 10b and an eighth-sized stamp such as that shown in FIG. 10c may be generated by performing successive iterations of the modified algorithm. In addition, many other sizes of stamps may be produced. The preferred embodiment operates by generating a two times reduction of the original image at each step. By applying this process iteratively, stamps of one half size, one fourth size, one eighth size and so on, are generated. Like the previously described method, this approach will be illustrated with respect to a 4×4 threshold array for dithering and with the same sample window configuration 2 as shown in FIG. 1.

The stamp producing method takes the four inner pixels of the windowed sample 3 (denoted as "P", "d", "g" and "h" in FIG. 1, respectively) and produces a corresponding single output pixel. The number of pixels in the sample window is limited to minimize computational requirements and decrease the size of the look-up table. The inner region of the sample region is a 2×2 region, whereas the output is a 1×1 region; hence, it is apparent that the output is reduced in size by a linear factor of 2.

The stamp producing algorithm first determines whether the pixel pattern within the window is likely to have arisen from a dither of a grey scale or from line art. If the windowed sample is likely to have arisen from a dither of a grey scale, an appropriate grey scale value that could have produced the dither product of the sample window is found using an approach like that described above. Once the grey scale value is found, the inner four pixels are redithered to produce a single output pixel. The details of how the redithering occurs will be given below. If it is determined that the windowed sample contains a pixel pattern that is likely to be line art, the four inner pixels "P", "d", "g" and "h" are compared with the eight surrounding neighbor pixels "a", "b", "c", "e", "f", "i", "j", and "k". Based upon this comparison, the system generates an appropriate output.

The general approach adopted for line art comprises counting the number of black pixels within the inner region of the windowed sample and comparing that number of black pixels with the number of black pixels in the outer neighboring region of eight pixels. If the number of black pixels in the outer neighboring region does not exceed twice the number of black pixels in the inner region, the output destination pixel is black. The rationale for assigning the output pixel a black value is that the inner region is not lighter than its neighborhood. This case includes the instance wherein twice the number of inner region black pixels equals the number of black pixels in the outer neighboring region. In general, it is desirable to favor the minority or foreground color in the case of ties. Thus, in the present case, black is favored because it is assumed that the coloring scheme is black on a white background. On the other hand, if a black background is used, the ties should favor white pixels and the rule is altered accordingly. On the other hand, if the number of black pixels in the neighboring region exceeds twice the number of black pixels in the inner region, the output pixel is white. There is one exception to the application of this general rule. If the inner region is entirely white, the output region is automatically white. The effect of this procedure, for line art, is to accentuate the difference between the source 2×2 set and its immediate neighborhood and also to display the enhanced difference as a single black or white pixel.

Figure 11:
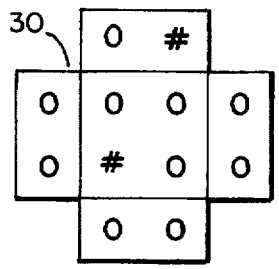
FIG. 11 depicts three example window patterns and how they are interpreted as output.
Figure 11:
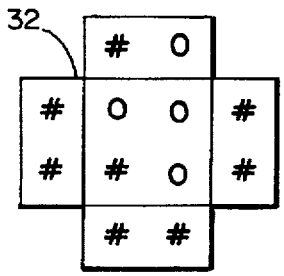
Figure 11:
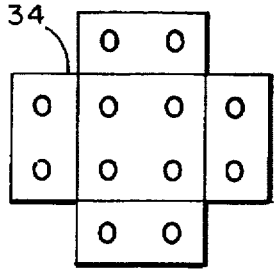

FIG. 11 provides three illustrations of the line art strategy in operation. In particular, for windowed sample 30, there is one black pixel in the inner region and one black pixel in the outer region. As such, since two times the number of black pixels in the inner region equals two and there is a single black pixel in the outer (neighboring) region, the output pixel is black pursuant the previously described rule. In the windowed sample 32, on the other hand, there are seven black pixels in the outside region and only one black pixel in the inner region. There are more than twice the number of black pixels in the outside region as there are in the inner region. The output pixel is, therefore, a white pixel. Lastly, as shown in windowed sample 34, there are all white pixels in the outside region and all white pixels in the inner region. Instead of comparing the number of pixels in the inner and outer regions, the exception to the rule is implemented so that the output is a white pixel.

When the windowed sample is found to be the result of dithering, the steps involved are somewhat more complex than in the line art case. As mentioned above, the basic approach is to determine the grey scale value for the dither pattern of the windowed sample and then, to redither to produce only a single pixel output for the 4 pixels in the inner region. The output pixel must be chosen from the appropriate X and Y phases of the resulting pixel's location because the redithering pattern is phase locked to the destination grid.

Two procedures, "shnkinit" and "shrink2X", which are encoded as software, process lines of a picture to produce the dithered and line art output in the form of a one half-sized stamp. How the redithering is performed in this context will be described with reference to these two procedures. Source code listings of the procedures encoded in the computer language C are included in the attached Appendix.

The system embodying these two procedures operates by relying on two tables. The first table of concern is the look-up table denoted as "lut". This table is much like the table suggested for the previously described method (FIGS. 5–7). For each possible windowed sample that is the product of dithering, an appropriate grey scale value is stored in the table. The three hexadecimal digits that characterize a windowed sample (6a, 6b and 6c in FIG. 1) are used as an index to look up the proper grey scale value in the table "lut". The table also provides the appropriate line art characterization given that the line art output can be characterized as a grey scale 0 for a white pixel or a grey scale 16 for a black pixel.

The table "lut" is initialized in the procedure "shnkinit". The table is comprised of 4,096 entries wherein a separate entry is provided for all of the $2^{12}$ ($2^{12}$=4096) possible bit patterns that the windowed sample may assume. The "hnkinit" procedure begins initially by placing values of 0 and 16 corresponding to the line art results for each of the 4096 patterns in each slot of the table. To determine the line art results, "shnkinit" counts the number of bits that are black within the inner region of the windowed sample as well as the number of bits in the outer neighboring region of the windowed sample and compares them. If the number of black bits in the outer region does not exceed twice the number of black bits in the inner region, a value of 16 is placed in the table entry to indicate a black pixel. Likewise, if the outer region has more than twice the number of black pixels, a value of zero indicating a white pixel is placed in the table entry. Furthermore, if all of the inner region pixels are white, a value of zero is placed in the table entry regardless of the number of black pixels in the outer region. It is, thus, apparent that this code implements the rule previously described for line art. The rule is applied for all 4,096 entries even those that may be the product of dithering.

Having filled the table with the proper line art characterization for each sample pattern, the system proceeds to over-write the grey scale values in the table for the sample patterns which, if found, are likely to be results of dithering. This is done by use of the "ini" procedure. As is evident by the code in the Appendix, the "ini" procedure accepts a single parameter which is an index that is used in conjunction with the variable "newentry". The parameter "index" is comprised of the hexadecimal digits that encode the sample pattern. The procedure "ini" assigns a grey scale value equal to "newentry" to the table entry at the index, but it also assigns 16 minus "newentry" as the grey scale value for the table entry at 4,095 minus the index. "ini" is instituted in this way to shorten the program listing by exploiting the symmetry between the two halves of the table. Moreover, "newentry" only assumes even grey scale values such as in FIG. 7 to resolve ambiguity of interpretation.

The "lut" table is used to determine the proper grey scale value for the sample window pattern being examined. If the window pattern is likely to be line art, the output is a "grey scale" value of 0 or 16 which redithers into a white pixel and a black pixel, respectively, regardless of the X and Y destination phase. On the other hand, if the sample window pattern is likely to be the product of dithering, the grey scale value (i.e. the condensed grey scale table value of FIG. 7) is used to redither and produce a dithered output.

To fully understand how the "shrink2X" procedure produces the output, it is necessary to first understand the second table exploited by this process. The second table is a 4×17 array denoted as "ansbyt". "ansbyt" is perhaps best viewed as being comprised of 4 separate tables, one for each vertical phase (i.e. row) of the 4×4 dither results. Each table holds a series of bits of the dither patterns that result when the threshold array previously described is applied to a 4×8 region of pixels having a grey scale value equal to the index of the table entry. Each entry in the array is comprised of 2 hexadecimal digits (i.e. 4 binary bits per hexadecimal digit) and, thus, is the equivalent of one byte (8 bits). The entries are stored according to the grey scale values and the corresponding row of dither results (referred to as the Y phase of the output). Thus, the first set of 17 output byte patterns is used for output lines 0, 4, 8, 12, . . . ; the second set is used for output lines 1, 5, 9, 13, . . . ; etc.

The first entry in the first table provides the first row that would result if the threshold array were applied to a 4×8 region of zero level pixels. Similarly, the second entry in the first table is the first row of the dither result for a 4×8 region of level 1pixels. Moreover, the second entry in the second table is the second row of the dither result for a 4×8 region of level 1 pixels. All of the entries corresponding to even level grey scale values are zero so that "ansbyt" is consistent with the condensed approach of FIG. 7 which resolves interpretative ambiguity.

Given this understanding of the "ansbyt" table, the following discussion will focus on the "shrink2X" procedure. As mentioned above, the "shrink2X" procedure serves a vital role in the generation of dithered bits in the shrunken stamp. Several parameters are passed to this procedure. First, four line pointers are passed as parameters. Each of these pointers points to a separate line in the source picture. In particular, the line pointers "topp" and "bott" point to the top line and the bottom line, respectively, of the pair of lines being compressed by "shrink2X". The pointer "abov" points to the line above the top line, and the pointer "next" points to the next line after the bottom line. The procedure "shrink2X" is also passed, as a parameter, a line pointer "dest" to the destination output line buffer. The final two parameters to this procedure, n and levmod4, indicate the number of characters in the destination line and the y destination phase, respectively.

The movement of the window and the processing of bits within the sample window must account for the ordering of the binary data of the picture. There are two common ways of ordering binary picture data. The first method packs the leftmost pixel of a set of eight pixels of the picture into the low order bit position of a byte. The second method, in contrast, packs the leftmost bit of the set of eight pixels into the high order bit position of a byte. Both of these methods order the lines from top to bottom and pack successive groups of eight pixels from left to right in successive bytes. Which method is appropriate is dictated in large part by the hardware being used. For present purposes, it is assumed that the second method is employed.

The "shrink2X" procedure operates to convert the source picture into the destination stamp by examining four lines at a time. These lines are those designated by "abov", "topp", "bott" and "next". Specifically, this procedure retains two successive bytes from each of the lines pointed to by these pointers. The current byte pair taken from the "abov" line is held in the variable "wa". Similarly, the current byte pairs taken from the lines pointed to by the pointers "topp" and "bott"are held in the variables "wt" and "wb", respectively. Lastly, the current byte pair taken from the line pointed to by "next" is held in the variable "wn".

As the code in the Appendix reveals, the "shrink2X" procedure processes this data from four respective lines to determine bytes from which the output bits will be selected. These bytes are denoted as b0 through b7 in the code listing in the Appendix. One bit is selected from each of these bytes (i.e., b0 through b7). Which bit is selected is dependent upon the X-phase of the output byte. The composition produces one output byte. This process continues along the four lines and along each successive collection of lines until all of the output bytes have been produced.

To get a better feel for how "shrink2X" operates, it is helpful to look at the code contained within the Appendix. As the code indicates, the variables "wa", "wt", "wb" and "wn" initially are assigned to the first two bytes in the lines pointed to by "abov", "topp", "bott" and "next", respectively. These words of data from the four lines are processed within the "for loop" that has i as an index. This "for loop" continues processing data until i=n. The variable "n" is a parameter passed into the "shrink2X" procedure indicating the number of output bytes to be produced. Since each iteration through the loop produces one output byte, i has a value equal to n when n output bytes have been produced.

Within the loop, the bytes b0, b1 and b2 are fetched initially. From these bytes, the three left-most bits of the output byte will be selected. After these bytes have been fetched, the variables "wa", "wt", "wb" and "wn" are shifted so as to get the next four input bytes. They are shifted to the left by 8 bits or one byte; hence, the left-most byte of these variables is shifted out and a new byte is shifted into the righthand byte of the word. Once this shifting is completed, the bytes from which the next four output bits will be selected are fetched. In particular, the bytes b3, b4, b5 and b6 are fetched.

Having selected these bytes, the system performs another shift that shifts the variables left along the lines by a byte. When this second shift is completed, the final byte, b7, is fetched. The right-most output bit is selected from this byte. It should be noted that in both of the shifts, if the end of line is reached for the current source lines, the pointers are each incremented by two lines so that new lines of the source picture are processed. If the end of the line is not currently reached, then standard shifting occurs as described above.

Having selected all the bytes from which the bits will be selected, the system composes an output byte wherein it chooses one bit from each of the selected bytes. The selection is realized by ANDing each of the bytes with a mask that selects a particular bit position.

Each of the fetched bytes, b0 through b7, is comprised of a dither result. The appropriate pixel within this dither result is selected by the composition step. In order to understand how the dither result byte is selected, it is necessary to look into the assignment statements that assign values to b0 through b7. The general pattern of these assignment statements is for that the fetched byte to equal the value pointed to by the pointer "p" plus a look-up table value. The pointer "p" points to one of the four tables within the "ansbyt" table. The look-up table "lut" is accessed to produce a grey scale value corresponding to the windowed sample pattern indicated by the index, thus "p" plus the look-up table value designates a particular entry within one of the four "ansbyt" tables. The logical statement that serves as the index for the look-up table refers to a particular windowed sample. How these logical statements compose a windowed sample is perhaps best illustrated by an example.

Figure 12:
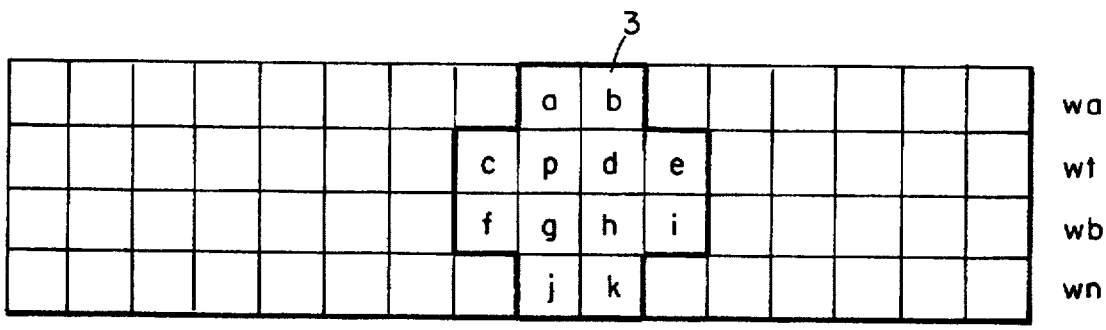
FIG. 12 illustrates a windowed sampled within a set of words fetched by the system.
Figure 13A:
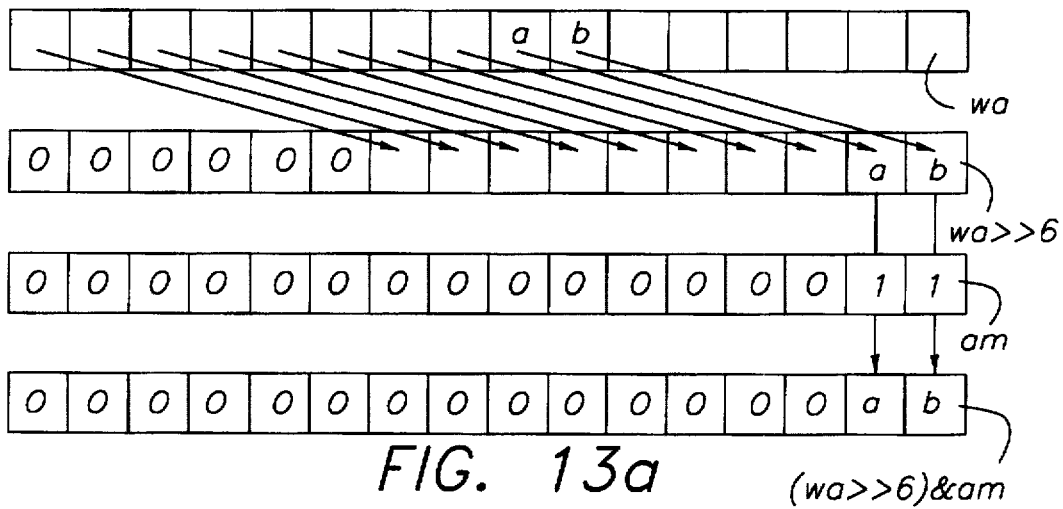
FIGS. 13a, 13b, 13c, 13d and 13e depict how logical operators are used to compose a windowed sample as an index to the look-up table.

The statement that fetches a value for the byte b4 is a good illustration of how the logical statement that serves as the index to the look-up table composes a windowed sample pattern. For illustrative purposes, suppose that the words from the four lines have been gathered such as shown in FIG. 12. In this instance, the system seeks to determine the grey scale value for the windowed sample 3 having bits in the positions such as set out in FIG. 1. As the code indicates, the variable "wa" is shifted right by six bits and ANDed with the mask "am". To understand the effect of this shifting and ANDing, it is useful to refer to FIG. 13a. The figure indicates the initial value of "wa". When "wa" is shifted to the right by six bits, the bits that "wa" contributes to the windowed sample 3 are also shifted right six bits so that they are in the right-most positions of the word. This shifted version of "wa" is then ANDed with the mask "am" that selects only these two right-most bits. As a result, the bitshifted and masked version of "wa" is comprised of all zeroes except for the bits "a" and "b" which are located in the right-most positions as indicated in FIG. 13a.

Figure 13B:
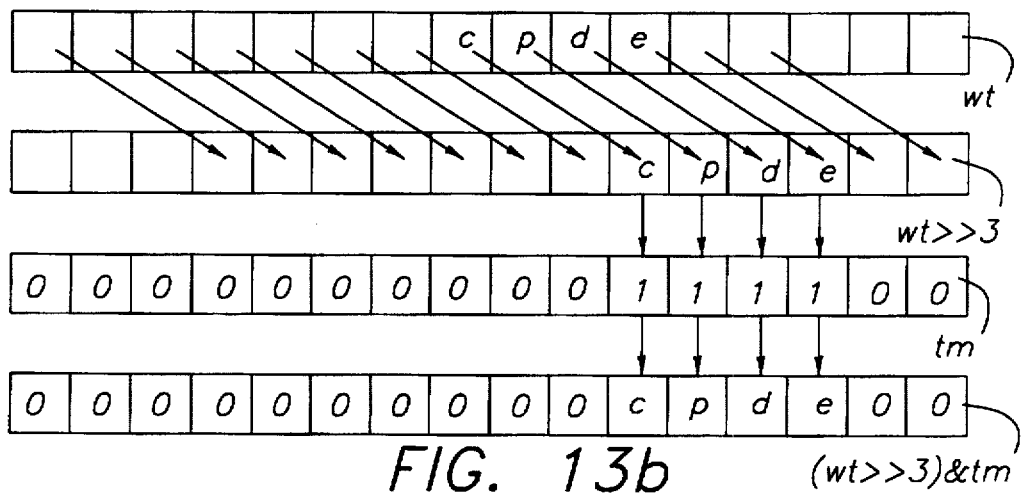

The statement in the code that fetches a value for b4 also indicates that the shifted and masked version of "wa" is ORed with the shifted and masked version of "wt". "wt" initially has the value indicated in FIG. 13b. It is shifted right by three bits to shift the respective position of the bits that lie within the windowed sample 3. The bit shifted version is than masked with the mask "tm". The mask selects only the bits within the windowed sample 3 and does not select any of the remaining bits. As a result, the shifted and masked version of "wt" is comprised of all zeros other than the bits that lie within the windowed sample 3.

Figure 13C:
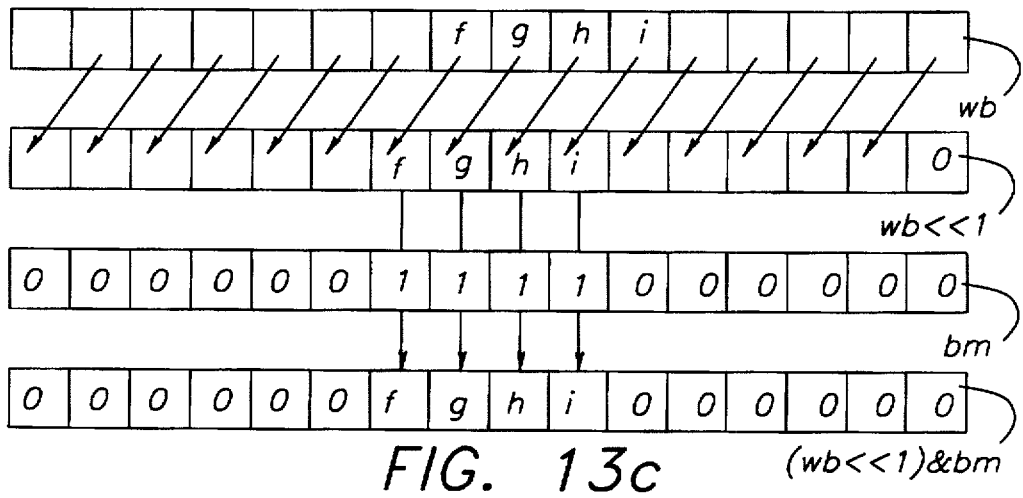
Figure 13D:
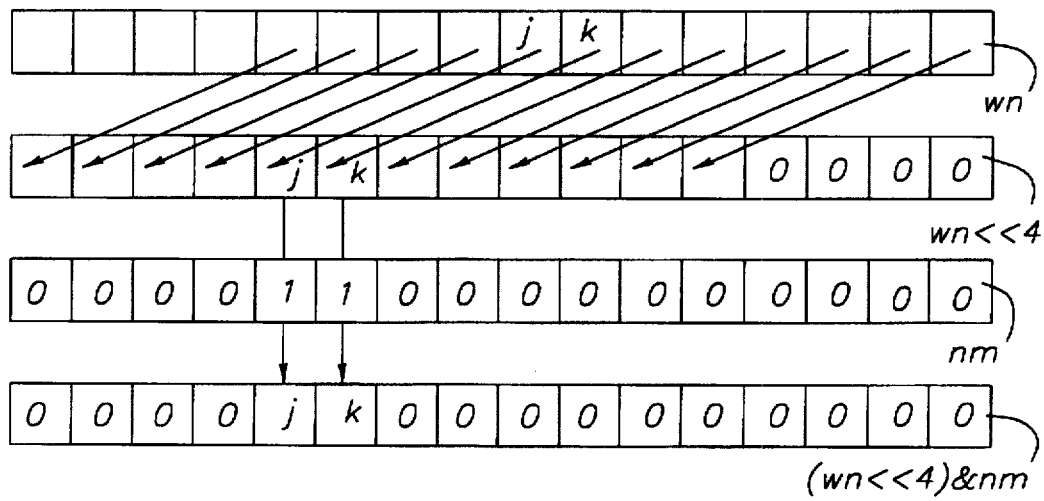
Figure 13E:
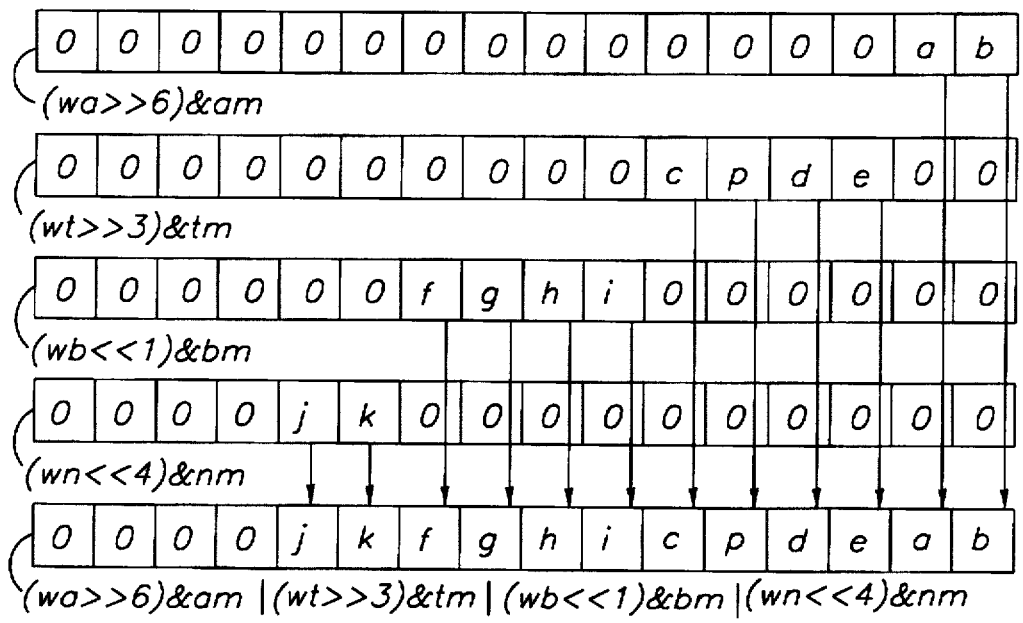

The remaining shifted and masked words selected from the four lines are ORed with those previously described to obtain the complete windowed sample. The shifting and masking of "wb" are depicted in FIG. 13c and the shifting and masking of "wn" are depicted in FIG. 13d. The result of ORing all of these shifted and masked words is depicted in FIG. 13e. The effect is that each of the bits from the windowed sample is composed into a single word of two bytes in length. The order in which the bits are positioned within this word corresponds with the order that bits are read out of the windowed sample as outlined in FIG. 1. Hence, it is apparent that the shifting, masking and ORing enables the selection of a windowed sample that is used as an index to the look-up table. The look-up table uses a windowed sample as an index to look up a grey scale value associated with that windowed sample. This grey scale value is then used along with the pointer "p" to select a dither product appropriate for the grey scale value retrieved by the look-up table. It is from this dither product that the output bit is selected, depending upon the X phase.

Figures 14A, 14B, 14C:
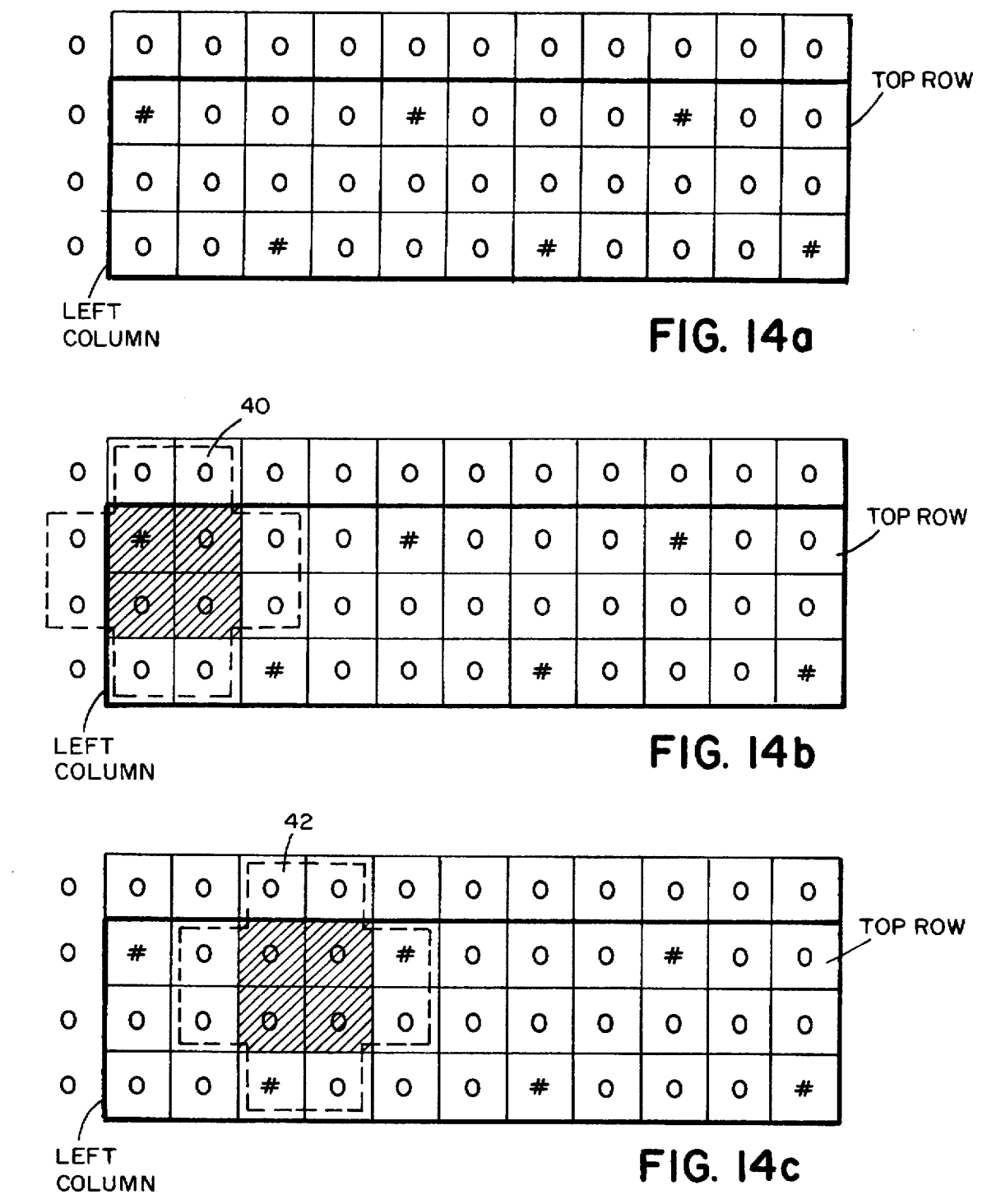
Figure 15A:
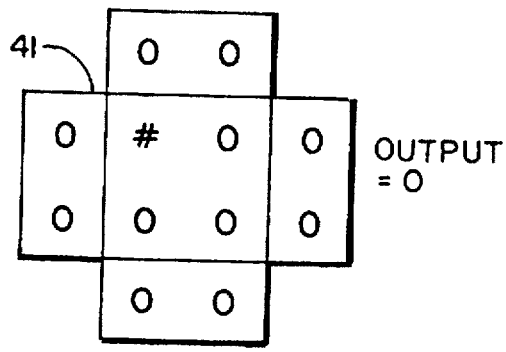
FIGS. 15a and 15b illustrate the sample window positions and corresponding output produced for those sample window positions of FIGS. 14b and 14c.
Figure 15B:
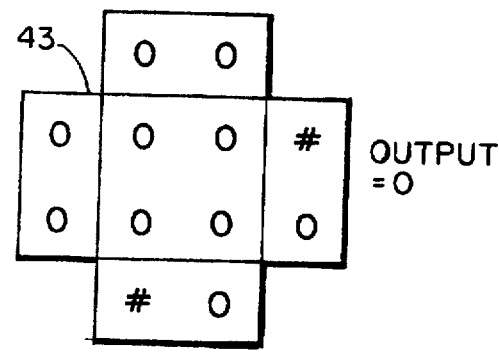

To illustrate the movement of the window that defines the windowed sample, a sample dither pattern for a 4×11 region of grey scale level two pixels is shown in FIG. 14a. Note that it is presumed that "0" neighbors are positioned all around the outside of the picture including above the top row and to the left of the left column. "shrink2X" initially positions the sample window (noted in phantom form) in position 40 as shown in FIG. 14b. It then moves the sample window over by 2 bits into sample position 42 shown in FIG. 14c. These two sample window positions 40 and 42 result in the windowed samples 41 and 43 shown in FIG. 15a and 15b, respectively. Given these sample patterns, the "shrink2X" procedure accesses the "lut" look-up table to determine the grey scale value for these samples. The first windowed sample 41 has a hexadecimal value of "010". It is interpreted as having a grey scale value of 2.

Figure 15C:
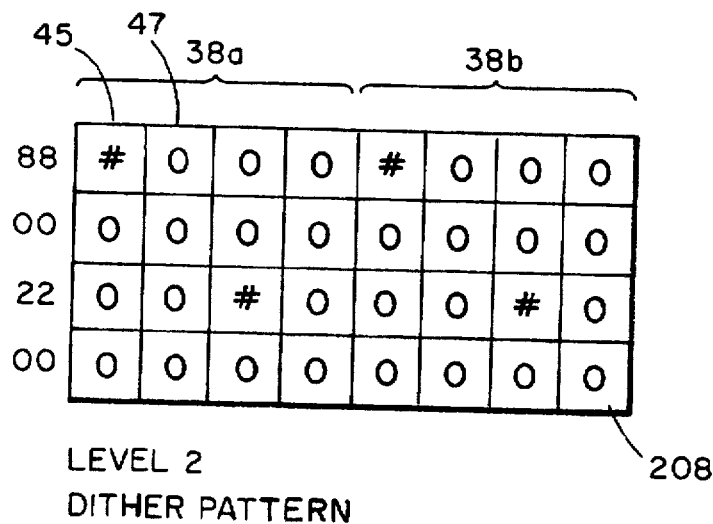
FIG. 15c illustrates portions of a dither patterns stored in an "ansbyt" lookup table.

Already knowing the grey scale value, the procedure looks inside the second table "ansbyt" to fetch a row of a dither pattern that is appropriate for that grey scale value of 2 and a given Y phase. For illustrative purposes, it is assumed that the Y phase is on the first row of the dither pattern. Each of the 4 consecutive tables in "ansbyt" holds a consecutive row of the dither pattern shown in FIG. 15c. Thus, the entry in the first table for an indexing grey scale value of two, holds a row of the dither pattern having a hexadecimal value of "88" (the first part 38a of the dither pattern defining one digit of the hexadecimal value, and the second part 38b of the dither pattern defining the second digit of the hexadecimal value). The second and forth tables each hold a respective row of dither pattern having a hexadecimal value of "00" for a grey scale index of two. And the third table holds a row of dither pattern having a hexidecimal value of "22" for a grey scale index of two.

In the current example the "shrink2X" procedure would assign b0 a value equal to the first row of the dither pattern. Moreover, the windowed sample 43 ("804" in hexadecimal) is deemed to have grey scale value of two. Thus, b1 would also be assigned the first row of the level 4 dither pattern shown in FIG. 15c (given the above assumed Y phase of the output). As mentioned above, this process continues until eight such bytes of dither patterns have been fetched. These bytes are labelled as b0-b7.

Figure 17:
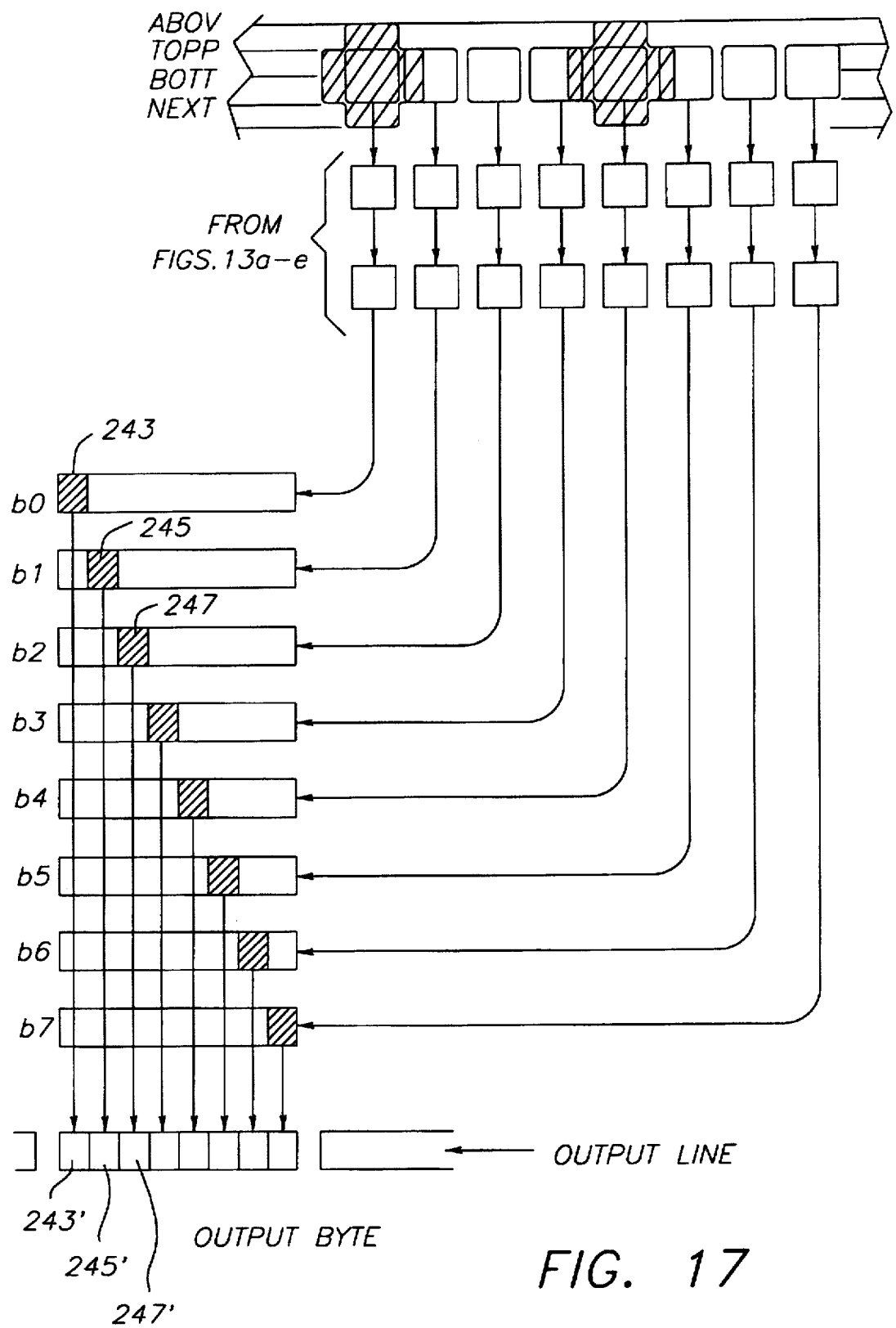
FIG. 17 illustrates how the bits from bytes b0–b7 are used to form the output byte.

Once the "shrink2X" procedure has gathered all of the 8 bytes, b0 through b7, it composes the output byte 241 (FIG. 17). In particular, the bit 243'(i.e. the highest order bit) is selected to have the value of bit 243 from b0, the second bit 245'is selected to have the value of bit 245 from b1, the third bit 247'is selected to have the value of bit 247 from b2, and so on until the output byte 241 is entirely composed. In the example case, the output for the sample window 41 shown in FIG. 15a, assuming a Y phase equal to 1, is the bit at position 45 of the dither pattern in FIG. 15c. This pixel is a black pixel. Similarly, the output for the second windowed sample pattern 43 (FIG. 15b) is the bit at position 47 (FIG. 15c) which is a white pixel. This composition of the output byte is listed in the Appendix at the statement that assigns a value to the byte to which "dest" points. The "++" indicates that the destination pointer is then incremented.

Figure 18:
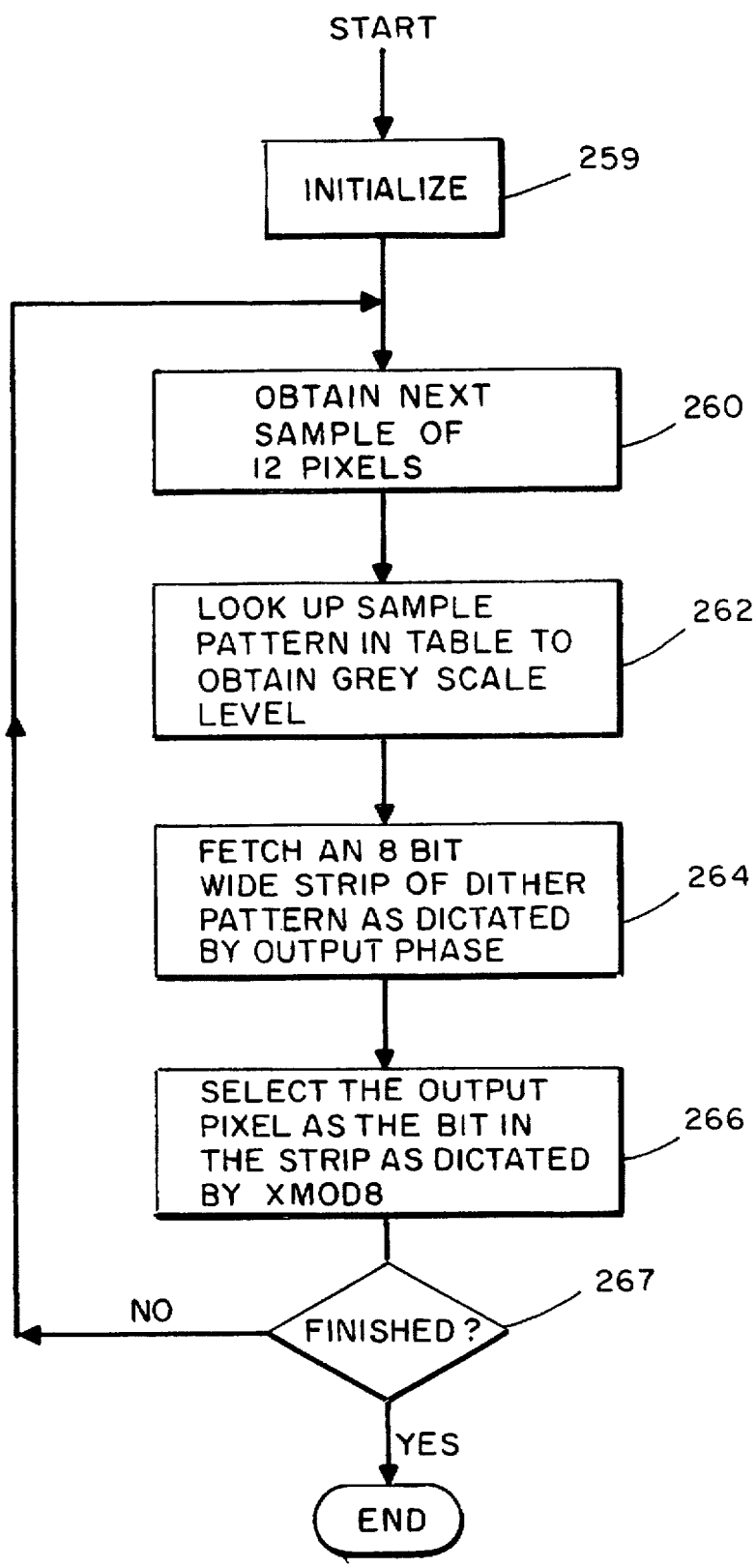
FIG. 18 is a flowchart of the major steps of an image reduction method embodying the present invention.

The stamp making process thus may be summarized in a number of steps. These steps are set out in a flowchart in FIG. 18. First, the variables and tables are initialized (step 259). Then a sample of 12 pixels is obtained (step 260). The grey scale value associated with the sample pattern is found by looking up the grey scale value in the look up table (step 262). Line art is therefore treated as a grey scale value (i.e. either 0 or 16). Next, an 8 bit wide strip of the dither pattern associated with the grey scale value of the sample is selected (step 264). The 8 bit wide strip is chosen based on the Y phase of the ouput. The output pixel is selected from this 8 bit wide strip based on the X phase as determined by X mod 8 (step 266). The system checks to see if it is finished (step 267). If not, it repeats the steps 260-267 for a next windowed sample.

The stamp-making method has been described with reference to a software implementation. Hardware implementations are, nonetheless, possible. One straightforward hardware approach is to hold four input lines streaming by a set of gates. The gates pick off successive patterns of bits in the sample window. The gates, then determine from the selected sample an appropriate output destination line on a pixel by pixel basis.

The stamp-making approach described above for generating miniaturized stamps may be generalized to produce enlargments as well as reductions. This generalized approach may be used to "re-size" the source image into a different size destination image having potentially different X and Y dimensions. In accordance with the generated approach, a source grid and a destination grid are defined. The two grids are then superimposed so that all of the source pixels are used and so that each part of a source pixel goes into one and only one destination pixel.

Figure 19:
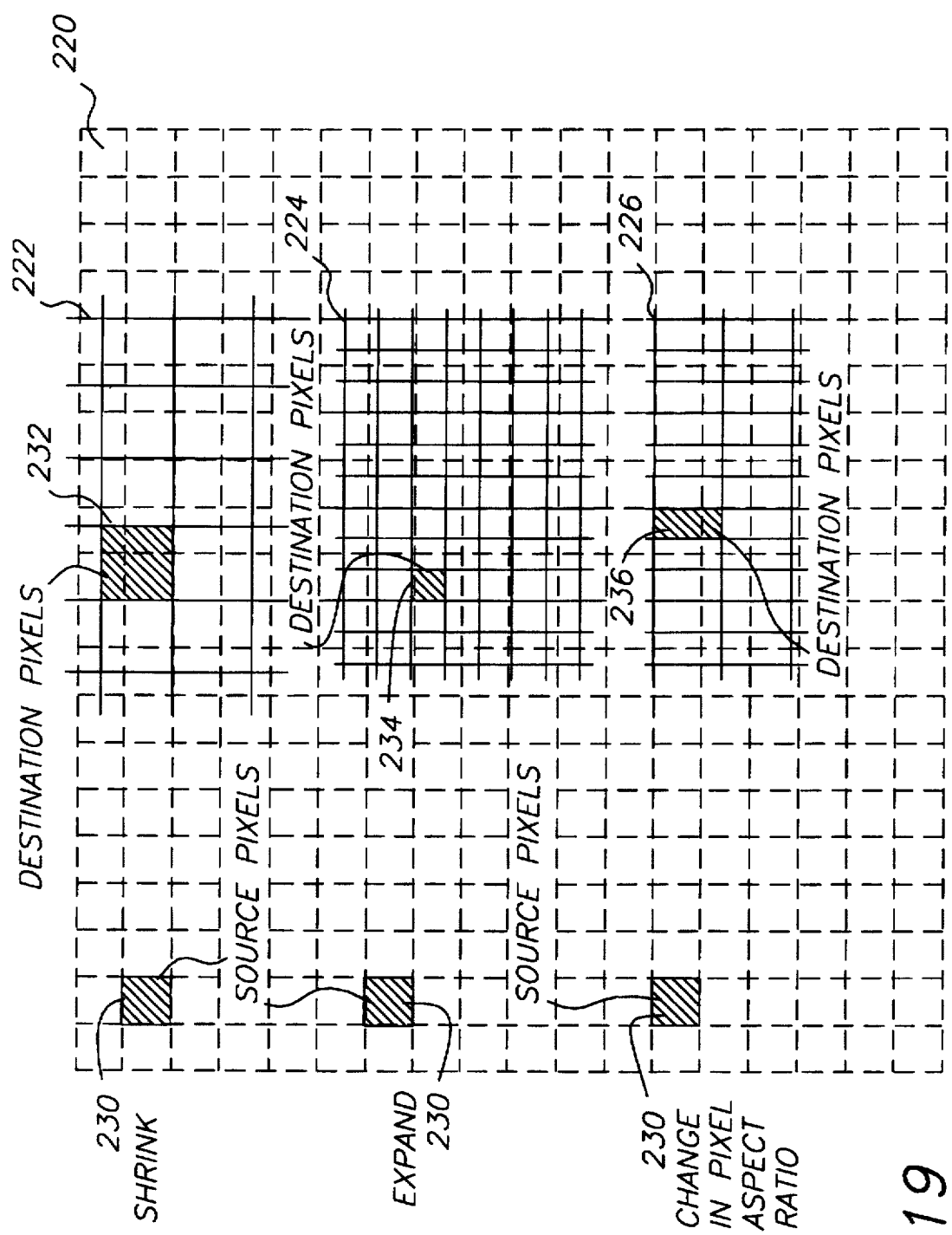
FIG. 19 illustrates a generalized approach to re-sizing.

FIG. 19 provides an illustration of the generalized approach. For picture reduction, each destination pixel such as 232 encompasses a total of more than one source pixel 230 and thus, must necessarily have contributions from more than one source pixel 230. As can be seen in FIG. 19, the destination grid 222 for this case is superimposed over the source grid 220.

For each picture enlargement, each destination pixel 234 comes from a total of less than one source pixel 230. As FIG. 19 illustrates, the destination grid 224 superimposes the source grid 220 such that each destination pixel 234 covers less than a single source pixel 230, but a destination pixel may nevertheless receive contributions from more than one source pixel. Lastly for a change in aspect ratio, the destination grid 226 is such that a destination pixel 236 may receive contributions from portions of different source pixels 230.

In resizing pictures, the decision is first made for each destination pixel as to whether it is to represent the pixel as line art or as a grey scale pixel. This is done by weighted voting of the contributing source pixels. The outcome of this vote then focuses all contributing source pixels to offer this type of contribution—line art or grey scale—to a weighted average result. Finally, if the destination pixel is considered to represent line art, the final weighted average of partial 16's and partial 0's is forced to 0 or 16 depending on whether it exceeds some threshold such as 8.

While the invention has been particularly shown and described with reference to preferred embodiments thereof, it will be understood by those skilled in the art that various changes in form and details may be made without departing from the spirit and scope of the invention as defined in appended claims. For example the shrinking of a picture into stamps need not follow the particular software described with reference to the preferred embodiment. Many alternative software approaches will be readily recognizable by those skilled in the art. Moreover, dithering arrays having sizes other than 4×4 may be used. A primary example of an alternative size is a 8×8 array. The 8×8, however, can be viewed as being comprised of four 4×4 grids. These grids will realize the same small dither samples as are produced by a single 4×4 grid.

Another alternative embodiment concerns the sample window. In particular, other sample window configurations are possible. It should be noted though that if such alternative window configurations span more than 1 dither array pattern in any direction, then, non-recognition of dithering errors are likely to occur. The errors of this type are likely to occur because in order to have a match with a dither pattern exact conformance with dithering over a larger area is necessary but unlikely at transitions of even a single grey level. Furthermore, the size of "lut" has to be changed to accomodate the different window size.

An additional alternative concerns the choice of dithering algorithm. The preferred embodiment has been described with reference to dispersed dot dithering. Other varieties of dithering algorithms may be used. Nevertheless, dispersed dot appears to be the optimal kind of dithering because the patterns it produces are very unlikely to arise in letter fonts, lines or other black and white art work.

An additional alternative concerns compression of image data for advantages in data handling. Typical image compression schemes use one-or two-dimensional coherence as the basis for establishing an expectation of what's coming next and therefore, on the average, the compressed image usually consists of fewer bytes than explicit pixel-by-pixel expanded image. With dithered images or images containing dithered parts, there is a lot of switching between black and white (1's and 0's) and therefore a special compression/ expansion scheme is needed—one which takes advantage of the likelihood that what's happening at a point is the same thing that happened, not at adjacent pixels, but rather what happened a dither-pattern width to the left and/or a dither-pattern height above. It should also serve well for line art, and should be simple and fast, both for encoding and decoding.

Figure 20A:
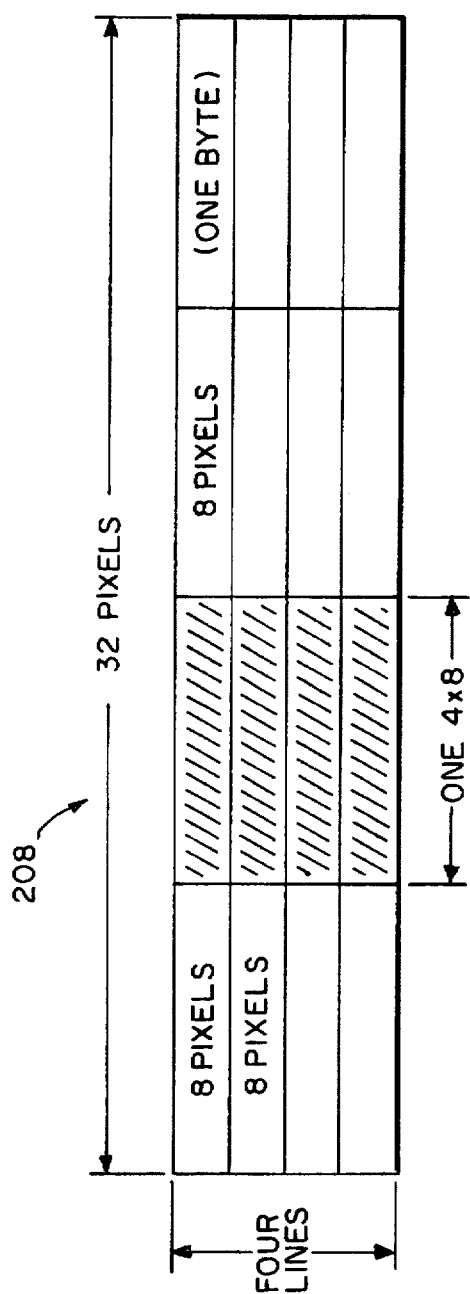
FIGS. 20a and 20b illustrate an optional compression method employable in embodiments of the present invention.

Such an encoding scheme is here presented for the case of a 4×4 dither pattern. It could obviously be altered to suit other sizes/shapes of dither patterns. To begin , lines are taken 4 at a time, from top to bottom of the total image. Each four line-high horizontal stripe is broken into large chunks 208 (Figure 20a), four bytes (32 pixels) wide. Each of these 4 lines high by 32 pixels wide chunks 208 is here called a '4×32', and in turn is broken into four smaller 4×8 chunks as shown in FIG. 20a.

Each 4×32 is encoded first of all with a one-byte header consisting of 4 dibits, one for each 4×8 pixel chunk i.e. 4-lines high by one-byte-wide):

0 0 the 4×8 is solid background;

0 1 the 4×8 exactly matches the neighboring 4×8 above; default background is assumed "above" the top of the image;

1 0 the 4×8 exactly matches the 4×8 neighbor to the left;

1 1 other (the 4×8 is decomposed).

note that the "background" may be started as either 0 or 1. It can be arranged to switch automatically if or when the solid non-background count of 4×8's in the recent past exceeds the solid background count (encoder and decoder must, of course, follow the same switching rules). And identity with left neighbor byte or left neighbor 4×8 can't be used on the left edge, not because of low probability wrap-around spatial coherence, but because, on decoding, the decoded left context isn't even there yet.

The header of each 4×32 is followed by respective decompositions (if any), each of which contains (1) a subheader of four dibits, one for each byte:

0 0 the byte is solid background (as described above)

0 1 the byte is identical to the one above it 1 0 the byte is identical to the one to its left (with the exception noted above)

1 1 other: the byte is as follows (i.e. an "explicit" byte) and (2) the explicit bytes (if any).

Figure 20B:
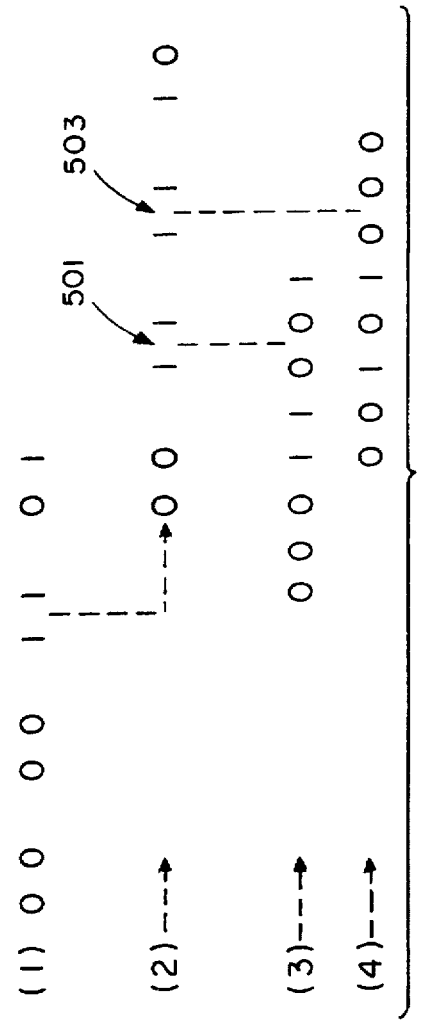

Figure 20b is illustrative of the foregoing. As an example, FIG. 20b shows four bytes (1) thru (4) from the compressed file top to bottom. The first byte (1) indicates two dibits each having a value "00". Thus, two 4×8's (four lines high by 8 pixels wide) have solid background, i.e. either 0 or 1 as explained above. One dibit with the value "11" indicates one decomposed 4×8. And the last dibit "01" of byte (1) indicates one 4×8 like that directly above it. Byte (2) provides one dibit value "00". This dibit indicates that one 4×8 has a solid background. The following 2 dibits 501, 503 each of value "11" indicate two 4×8's of explicit image data. And the last dibit "10" byte (2) indicates one 4×8 like the left neighbor byte. Accordingly, byte (3) holds the exact bit pattern of the first "explicit" byte 501 in byte (2). And byte (4) indicates the exact bit pattern of the other explicit byte 503 in byte (2).

It is understood that other similiar compression/ decompression schemes may be employed by the present invention.

The foregoing alternative embodiments are intended to be encompassed within the present invention.

APPENDIX

```
/* 4 tables for re-dithering, one for each output-y-mod-4. Each table holds 17
* 8-bit samples of dither pattern (odd grey values not used in this version).
*/
unsigned char ansbyt[4][17] = {
{0x00, 0, 0x88, 0, 0xAA, 0, 0xAA, 0, 0xAA, 0, 0xAA, 0, 0xAA, 0, 0xEE, 0, 0xFF},
{0x00, 0, 0x00, 0, 0x00, 0, 0x44, 0, 0x55, 0, 0xDD, 0, 0xFF, 0, 0xFF, 0, 0xFF},
{0x00, 0, 0x22, 0, 0xAA, 0, 0xAA, 0, 0xAA, 0, 0xAA, 0, 0xAA, 0, 0xBB, 0, 0xFF},
{0x00, 0, 0x00, 0, 0x00, 0, 0x11, 0, 0x55, 0, 0x77, 0, 0xFF, 0, 0xFF, 0, 0xFF}
};
unsigned char lut[4096]; /* the table which yields grey values 0 through 16 */
/* ini() initializes two symetrically-located locations in lut */
short newentry;
ini ( index)
short index;
{
        lut[    index] =       newentry;
        lut[4095-index] = 16 - newentry;
        return;
}
```

-continued

APPENDIX

```c
/* fill lut with entries for line art, override with dither interpretation */
short shinited = 0;    /* has lut been initialized ? */
shnkinit()
{
        short i,o,j;
        /* fill lut[] with local contrast interpretation (for line art) */
        for(j=0; j<4096; j++){
                i = o = 0;  /* counts: i = inside bits, o = outside bits */
                        if(j&0x002)o++; if(j&0x001)o++;
                if(j&0x020)o++; if(j&0x010)i++; if(j&0x008)i++; if(j&0x004)o++;
                if(j&0x200)o++; if(j&0x100)i++; if(j&0x080)i++; if(j&0x040)o++;
                        if(j&0x800)o++; if(j&0x400)o++;
                if(i && (2*i >= o))lut[j] = 16;
                else          lut[j] = 0;
        }
        /* override with dither treatment for recognized patterns */
        newentry = 0;
        ini(0x000); ini(0x001); ini(0x002); ini(0x400); ini(0x800); ini(0x200);
        ini(0x040); ini(0x020); ini(0x004);
        newentry = 2;
        ini(0x201); ini(0x042); ini(0x420); ini(0x804); ini(0x080); ini(0x100);
        ini(0x008); ini(0x010); ini(0x280); ini(0x028); ini(0x140); ini(0x014);
        ini(0x081); ini(0x408); ini(0x102); ini(0x810);
        newentry = 4;
        ini(0x281); ini(0x142); ini(0x428); ini(0x814); ini(0x42A); ini(0xA81);
        ini(0x162); ini(0xA14); ini(0x285); ini(0x468); ini(0x815); ini(0x542);
        newentry = 6;
        ini(0x46A); ini(0xA85); ini(0x562); ini(0xA15); ini(0x291); ini(0x528);
        ini(0x14A); ini(0x894); ini(0xA91); ini(0x52A); ini(0xA94); ini(0x16A);
        ini(0x568); ini(0x295); ini(0x54A); ini(0x895);
        newentry = 8;
        ini (0xA95);
        shinited = 1;
        return;
}
/* masks for four parts of 12-bit number to look up in lut[] */
unsigned short am = 0x003, tm = 0x03C, bm = 0x3C0, nm = 0xC00;
/* process one line, i.e. compress the "topp" and "bott" line to a single line
 * half as long, using in addition the line "abov" and the "next" line (below).
 */
shrink2x(      abov, topp, bott, next, dest,n,levmod4)
unsigned char *abov,*topp,*bott,*next,*dest;
short                                   n,levmod4;
{
        unsigned char *p;           /* ptr to 1 of 4 17-long tbl dith bytes */
        unsigned short wa,wt,wb,wn; /* two consecutive bytes from each line */
        unsigned short i,b0,b1,b2,b3,b4,b5,b6,b7;
        if(!shinited)shnkinit();
        p    = ansbyt[levmod4%4];
        wa   = *abov;
        wt   = *topp;
        wb   = *bott;
        wn   = *next;
        /* for each destination byte: use 2 input bytes from each of 4 lines
         * Note C precedence: "wb>>3&tm | ..." parses as "((wb>>3)&tm) | ..."
         */
        for(i=0; i<n; i++){
                /* fetch bytes from which leftmost 3 bits will be picked */
                b0 = *(p + lut[wa>>6&am | wt>>3&tm | wb<<1&bm | wn<<4&nm]);
                b1 = *(p + lut[wa>>4&am | wt>>1&tm | wb<<3&bm | wn<<6&nm]);
                b2 = *(p + lut[wa>>2&am | wt<<1&tm | wb<<5&bm | wn<<8&nm]);
                /* shift input, get next four input bytes */
                wa = wa<<8 | *(++abov);
                wt = wt<<8 | *(++topp);
                wb = wb<<8 | *(++bott);
                wn = wn<<8 | *(++next);
                /* fetch bytes from which next 4 output bits will be picked */
                b3 = *(p + lut[wa>>8&am | wt>>5&tm | wb>>1&bm | wn<<2&nm]);
                b4 = *(p + lut[wa>>6&am | wt>>3&tm | wb<<1&bm | wn<<4&nm]);
                b5 = *(p + lut[wa>>4&am | wt>>1&tm | wb<<3&bm | wn<<6&nm]);
                b6 = *(p + lut[wa>>2&am | wt<<1&tm | wb<<5&bm | wn<<8&nm]);
                /* shift input, get next four input bytes */
                wa = wa<<8 | *(++abov);
                wt = wt<<8 | *(++topp);
                wb = wb<<8 | *(++bott);
                wn = wn<<8 | *(++next);
                /* fetch byte from which rightmost output bit will be picked */
                b7 = *(p + lut[wa>>8&am | wt>>5&tm | wb>>1&bm | wn<<2&nm]);
```

-continued

APPENDIX

```
/* compose output byte: pick one bit from each chosen byte */
*(dest++) = b0 & 0x80 | b1 & 0x40 | b2 & 0x20 | b3 & 0x10 |
            b4 & 0x08 | b5 & 0x04 | b6 & 0x02 | b7 & 0x01;
    }
    return;
}
```

(c) Copyright 1990 Wang Laboratories Inc.

I claim:

1. In a data processing system including a processor for operating upon data representing images and a memory connected from the processor for storing data representing images and program routines for controlling operations of the processor, a method of converting a dithered representation of an image to a discretely quantized continuous tone representation of the image, the dithered representation including a plurality of binary data bits, each binary data bit representing a state of a pixel of the image, said method comprising the steps of:

a) storing the dithered representation of an image in the memory;

b) storing in the memory a plurality of predetermined ordered patterns of pixels wherein each predetermined ordered pattern of pixels represents an ordered pattern of pixels generated by applying a dithering dot threshold array to an image area having a uniform continuous tone value of a corresponding one of a plurality of continuous tone values and each one of the plurality of continuous tone values corresponding to a matching one of the predetermined ordered patterns of pixels;

c) by operation of the processor operating under control of a program routine, determining a single viewing window having a fixed, predefined size and shape;

d) by operation of the processor operating under control of a program routine and using the viewing window, establishing windowed regions of the dithered regions of the dithered representation of the image, each windowed region defining an ordered pattern of pixels in the image and containing a pixel of the image which is to be assigned a discretely quantized continuous tone value;

e) by operation of the processor operating under control of a program routine and for each windowed region, comparing the ordered pattern of pixels defined by the windowed region with the predetermined ordered patterns of pixels, said comparing of ordered patterns of pixels being performed on a pixel by pixel basis and determining when the ordered pattern of pixels defined by the windowed region matches one of the plurality of predetermined ordered patterns of pixels;

f) by operation of the processor operating under control of a program routine and when a one of the plurality of predetermined ordered patterns of pixels is found to match the ordered pattern of pixels defined by the windowed region, directly assigning a continuous tone value corresponding to the matching one of the plurality of predetermined ordered patterns of pixels to the pixel of the image which is to be assigned a discretely quantized continuous tone value to create a discretely quantized continuous tone representation of the image, wherein, for each pixel of the image, an assigned continuous tone value is directly selected from the continuous tone values corresponding to the one of the plurality of predetermined ordered patterns of pixels matching the ordered patterns of pixels defined by the window for the pixel of the image; and g) by operation of the processor operating under control of a program routine, generating a pixel of the discretely quantized continuous tone representation of the image by writing the continuous tone value into the memory at a location occupied by the pixel of the discretely quantized continuous tone representation of the image.

2. In a data processing system including a processor for operating upon data representing images and a memory connected from the processor for storing data representing images and program routines for controlling operations of the processor, a method of converting an initial representation of an image comprised of dithered regions and line art to a discretely quantized continuous tone representation of the image, said initial representation of the image including a plurality of binary data bits, each binary data bit representing a state of a pixel of the image, said method comprising the steps of:

a) storing the dithered representation of an image in the memory;

b) storing in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the plurality of continuous tone values corresponding to a matching one of the predetermined dither patterns of pixels;

c) by operation of the processor operating under control of a program routine, determining a single viewing window having a fixed, predetermined size and shape;

d) by operation of the processor operating under control of a program routine and using the viewing window, establishing windowed regions of the dithered representation of the image, each windowed region defining an ordered pattern of pixels in the image and containing a pixel of the image which is to be assigned a discretely quantized continuous tone value;

e) by operation of the processor operating under control of a program routine and for each windowed region, comparing the ordered pattern of pixels defined by the windowed region of the initial representation of the image with the plurality of predetermined dither patterns of pixels on a pixel by pixel basis to determine when one of the plurality of dither patterns matches the pattern of pixels defined by the windowed region, the windowed region being designated a dithered region of the image when one of the plurality of dither patterns matches the pattern of pixels defined by the windowed region;

f) by operation of the processor operating under control of a program routine and for each designated dithered windowed region, directly assigning the continuous tone value corresponding to the matching one of the plurality of predetermined dither patterns of pixels to the pixel of the image which is to be assigned a discretely quantized continuous tone value; and g) by operation of the processor operating under control of a program routine, generating a pixel of the discretely quantized continuous tone representation of the image by writing the continuous tone value into the memory at a location occupied by the pixel of the discretely quantized continuous tone representation of the image.

3. In a data processing system including a processor for operating upon data representing images and a memory connected from the processor for storing data representing images and program routines for controlling operations of the processor, a method of converting an initial representation of an image comprised of dithered regions and line art to a discretely quantized continuous tone representation of the image, said initial representation of the image including a plurality of binary data bits, each binary data bit representing a state of a pixel of the image, said method comprising the steps of:

a) storing the dithered representation of an image in the memory;

b) storing in the memory in a table a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the plurality of continuous tone values corresponding to a matching one of the predetermined ordered patterns of pixels;

c) by operation of the processor operating under control of a program routine, determining a single viewing window having a fixed, predetermined size and shape and, using the viewing window, establishing windowed regions of the dithered representation of the image, each windowed region defining an ordered pattern of pixels in the image and containing a pixel of the image which is to be assigned a discretely quantized continuous tone value;

d) by operation of the processor operating under control of a program routine and for each windowed region, comparing the ordered pattern of pixels defined by the windowed region of the initial representation of the image with the plurality of predetermined dither patterns of pixels on a pixel by pixel basis to determine when one of the plurality of dither patterns matches the pattern of pixels defined by the windowed region, the windowed region being designated a dithered region of the image when one of the plurality of dither patterns matches the pattern of pixels defined by the windowed region and wherein the predetermined patterns of pixels are selected for line art such that said step of comparing will provide an indication that there is no match between the ordered pattern of pixels defined by the viewing window of the initial representation of the image and a one of the predetermined dither patterns;

e) by operation of the processor operating under control of a program routine and for each designated dithered windowed region, directly assigning the continuous tone value corresponding to the matching one of the plurality of dither patterns to the pixel of the image which is to be assigned a discretely quantized continuous tone value wherein the step of assigning a discretely quantized continuous tone value to the pixel of the image which is to be assigned a discretely quantized continuous tone value comprises directly assigning the pixel a discretely quantized continuous tone value which equals the value of the binary data bit representing the state of the pixel; and f) by operation of the processor operating under control of a program routine, generating a pixel of the discretely quantized continuous tone representation of the image by writing the continuous tone value into the memory at a location occupied by the pixel of the discretely quantized continuous tone representation of the image.

4. In a data processing system including a processor for operating upon data representing images and a memory connected from the processor for storing data representing images and program routines for controlling operations of the processor, a method of converting a given pixel in a portion of an initial representation of an image having dithered regions and line art to a pixel in a discretely quantized continuous tone representation of the portion of the image, said initial representation of the image including a plurality of binary data bits, each binary data bit representing a state of a pixel of the image, said method comprising the steps of:

a) storing the initial representation of the image in the memory.

b) storing in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined dither patterns of pixels;

c) by operation of the processor operating under control of a program routine, defining a viewing window of pixels having a fixed, predefined size and shape in the initial representation of the image, the viewing window having a predefined size and shape defined by a predetermined ordered pattern of pixels;

d) by operation of the processor operating under control of a program routine, determining position of a given pixel within the viewing window;

e) by operation of the processor operating under control of a program routine, comparing the ordered pattern of pixels within the viewing window with the plurality of predetermined dither patterns of pixels on a pixel by pixel basis to determine when one of the plurality of dither patterns matches the pattern of pixels in the viewing window, the pattern of pixels in the viewing window being designated a dithered region of the image when one of the plurality of dither patterns matches the pattern of pixels; in the viewing window;

f) by operation of the processor operation under control of a program routine and wherein the pattern of pixels in the viewing window is designated as a dithered region, directly assigning the continuous tone value corresponding to the matching one of the plurality of dither patterns to the given pixel, and f) by operation of the processor operating under control of a program routine, generating a pixel of the discretely quantized continuous tone representation of the portion of the image by writing the continuous tone value into the memory at a location occupied by the pixel of the discretely quantized continuous tone representation of the portion of the image.

5. In a data processing system including a processor for operating upon data representing images and a memory connected from the processor for storing data representing images and program routines for controlling operations of the processor, a method of converting a given pixel in a portion of an initial representation of an image having dithered regions and line art to a pixel in a discretely quantized continuous tone representation of the portion of the image, said initial representation of the image including a plurality of binary data bits, each binary data bit representing a state of a pixel of the image, said method comprising the steps of:

a) storing the initial representation of the image in the memory;

b) storing in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined dither patterns of pixels;

c) by operation of the processor operating under control of a program routine, defining a substantially t-shaped viewing window of pixels having a fixed, predefined size and shape in the initial representation of the image, the window having a predefined size and shape and defining an ordered pattern of pixels within the window;

d) by operation of the processor operating under control of a program routine, determining position of the given pixel within the viewing window;

e) by operation of the processor operating under control of a program routine, comparing the ordered pattern of pixels within the viewing window with the plurality of predetermined dither patterns of pixels on a pixel by pixel basis to determine when one of the plurality of dither patterns matches the pattern of pixels in the viewing window, the pattern of pixels in the viewing window being designated a dithered region of the image when one of the plurality of dither patterns matches the pattern of pixels in the viewing window;

f) by operation of the processor operating under control of a program routine and wherein the pattern of pixels in the viewing window is designated as a dithered region, directly assigning the continuous tone value corresponding to the matching one of the plurality of dither patterns to the given pixel; and g) by operation of the processor operating under control of a program routine, generating a pixel of the discretely quantized continuous tone representation of the portion of the image by writing the continuous tone value into the memory at a location occupied by the pixel of the discretely quantized continuous tone representation of the portion of the image.

6. In a data processing system including a processor for operating upon data representing images and a memory connected from the processor for storing data representing images and program routines for controlling operations of the processor, a method of converting a given pixel in a portion of an initial representation of an image having dithered regions and line art to a pixel in a discretely quantized continuous tone representation of the portion of the image, said initial representation of the image including a plurality of binary data bits, each binary data bit representing a state of a pixel of the image, said method comprising the steps of:

a) storing the initial representation of the image in the memory;

b) storing in a table in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the plurality of continuous tone values corresponding to a matching one of the predetermined dither patterns of pixels;

c) by operation of the processor operation under control of a program routine, defining a viewing window of pixels having a fixed, predefined size and shape in the initial representation of the image, the viewing window having a predefined size and shape and defined by an ordered pattern of pixels;

d) by operation of the processor operating under control of a program routine, determining position of the given pixel within the window;

e) by operation of the processor operating under control of a program routine comparing the ordered pattern of pixels within the viewing window with the plurality of predetermined dither patterns of pixels on a pixel by pixel basis to determine when one of the plurality of predetermined dither patterns matches the pattern of pixels defined by the windowed region, the ordered pattern of pixels within the viewing window being designated a dithered region of the image when one of the plurality of dither patterns matches the ordered pattern of pixels within the viewing window and wherein the plurality of predetermined dither patterns of pixels are selected for line art such that said step of comparing will provide an indication that there is no match between the ordered pattern of pixels defined by the viewing window of the initial representation of the image and a one of the predetermined dither patterns of pixels;

e) by operation of the processor operating under control of a program routine and wherein the window region is designated as a dithered region, directly assigning the continuous tone value corresponding to the matching one of the plurality of dither patterns to the given pixel wherein the step of assigning a discretely quantized continuous tone value to the given pixel comprises directly assigning the given pixel a discretely quantized continuous tone value which equals the value of the binary data bit representing the state of the pixel; and f) by operation of the processor operating under control of a program routine, generating a pixel of the discretely quantized continuous tone representation of the portion of the image by writing the continuous tone value into the memory at a location occupied by the pixel of the discretely quantized continuous tone representation of the portion of the image.

7. In a data processing system including a processor for operating upon data representing images and a memory connected from the processor for storing data representing images and program routines for controlling operations of the processor, a method of converting an initial representation of an image including dithered regions and line art to a discretely quantized continuous tone representation of the image, the initial representation including a plurality of binary data bits, each binary data bit representing a state of a pixel of the image, said method comprising the steps of:

a) storing the initial representation of the image in the memory;

b) storing in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined dither patterns of pixels;

c) by operation of the processor operating under control of a program routine, determining a single viewing window having a fixed predefined size and shape, the single viewing window having a predefined size and shape defined by a predetermined ordered pattern of pixels;

d) by operation of the processor operating under control of a program routine, defining an ordered pattern of pixels within the single viewing window for examination within the initial representation of the image wherein a selected pixel is included within the window at a selected position;

e) by operation of the processor operating under control of a program routine, comparing the ordered pattern of pixels within the single viewing window with the plurality of predetermined dither patterns of pixels to determine when one of the plurality of predetermined dither patterns of pixels matches the ordered pattern of pixels within the single viewing window, the ordered pattern of pixels within the single viewing window being designated a dithered region of the image when one of the plurality of predetermined dither patterns of pixels matches the ordered pattern of pixels within the single viewing;

f) by operation of the processor operating under control of a program routine and where the ordered pattern of pixels within the single viewing window is designated as a dithered region, directly assigning the continuous tone value corresponding to the matching one of the plurality of predetermined dither patterns of pixels to the selected pixel;

f) for each remaining pixel in the initial representation of the image, positioning the single viewing window so that the remaining pixel is in the selected position of the single viewing window and repeating the steps of comparing and identifying for the remaining pixels, and g) by operation of the processor operating under control of a program routine, generating a pixel of the discretely quantized continuous tone representation of the image by writing the continuous tone value into the memory at a location occupied by the pixel of the discretely quantized continuous tone representation of the image.

8. In a data processing system including a processor for operating upon data representing images and a memory connected from the processor for storing data representing images and program routines for controlling operations of the processor, a method of converting an initial representation of an image including dithered regions and line art to a discretely quantized continuous tone representation of the image, the initial representation including a plurality of binary data bits, each binary data bit representing a state of a pixel of the image, said method comprising the steps of:

a) storing the initial representation of the image in the memory;

b) storing in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined dither patterns of pixels;

c) by operation of the processor operating under control of a program routine, determining a substantially t-shaped single viewing window having a fixed, predefined size and shape, the single viewing window having a predefined size and shape defined by a predetermined ordered pattern of pixels;

d) by operation of the processor operating under control of a program routine, defining an ordered pattern of pixels within the single viewing window for examination within the initial representation of the image wherein a selected pixel is included within the single viewing window at a selected position;

e) by operation of the processor operating under control of a program routine, comparing the ordered pattern of pixels within the single viewing window with the plurality of predetermined dither patterns of pixels to determine when one of the plurality of predetermined dither patterns matches the ordered pattern of pixels, the ordered pattern of pixels within the single viewing window being designated a dithered region of the image when one of the plurality of predetermined dither patterns matches the ordered pattern of pixels within the single viewing window;

f) by operation of the processor operating under control of a program routine and where the ordered pattern of pixels within the single viewing window is designated as a dithered region, directly assigning the continuous tone value corresponding to the matching one of the plurality of predetermined dither patterns to the selected pixel;

g) by operation of the processor operating under control of a program routine and for each remaining pixel in the initial representation of the image, positioning the window so that the remaining pixel is in the selected position of the single viewing window and repeating the steps of comparing and identifying for the remaining pixels; and h) by operation of the processor operating under control of a program routine, generating a pixel of the discretely quantized continuous tone representation of the image by writing the continuous tone value into the memory at a location occupied by the pixel of the discretely quantized continuous tone representation of the image.

9. In a data processing system including a processor for operating upon data representing images and a memory connected from the processor for storing data representing images and program routines for controlling operations of the processor, a method of converting an initial representation of an image including dithered regions and line art to a discretely quantized continuous tone representation of the image, the initial representation including a plurality of binary data bits, each binary data bit representing a state of a pixel of the image, said method comprising the steps of:

a) storing the initial representation of the image in the memory;

b) storing in a table in the memory a plurality of predetermined dither patterns of pixels wherein each predetermined dither pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined dither patterns of pixels;

c) by operation of the processor operating under control of a program routine, determining a single viewing window having a fixed, predefined size and shape;

d) by operation of the processor operating under control of a program routine, defining an ordered pattern of pixels within the single viewing window for examination within the initial representation of the image wherein a selected pixel is included within the single viewing window at a selected position;

e) by operation of the processor operating under control of a program routine, comparing the ordered pattern of pixels within the single viewing window with the plurality of predetermined dither patterns of pixels to determine when one of the plurality of predetermined dither patterns of pixels matches the ordered pattern of pixels within the single viewing window, the ordered pattern of pixels within the single viewing window being designated a dithered region of the image when one of the plurality of predetermined dither patterns of pixels matches the ordered pattern of pixels within the single viewing window, and wherein the predetermined dither patterns of pixels are selected for line art such that said step of comparing will provide an indication that there is no match between the ordered pattern of pixels within the single viewing window of the initial representation of the image and a one of the predetermined dither patterns of pixels;

f) by operation of the processor operating under control of a program routine and where the ordered pattern of pixels within the single viewing window of pixels is designated as a dithered region, directly assigning the continuous tone value corresponding to the matching one of the plurality of predetermined dither patterns to the selected pixel and the step of assigning a discretely quantized continuous tone value to the selected pixel comprises directly assigning the selected pixel a discretely quantized continuous tone value which equals the value of the binary data bit representing the state of the selected pixel;

g) by operation of the processor operating under control of a program routine and for each remaining pixel in the initial representation of the image, positioning the window so that the remaining pixel is in the selected position of the window and repeating the steps of comparing and identifying for the remaining pixels; and h) by operation of the processor operating under control of a program routine, generating the pixels of the discretely quantized continuous tone representation of the image by writing the continuous tone values into the memory at locations occupied by the pixels of the discretely quantized continuous tone representation of the image.

10. A data processing system for converting an initial representation of an image including dithered regions and line art regions to a gray scale representation of the image, said initial representation of the image including a plurality of binary data bits, each binary data bit representing a state of a pixel of the image, said data processing system comprising:

a) a memory for storing the initial representation of the image and a plurality of predetermined ordered patterns of pixels wherein each predetermined ordered pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined ordered patterns of pixels; and b) a connected from the memory and having access to the memory and operating under control of program routines for processing the initial representation of the image to convert the initial representation of the image to a gray scale representation, said processor being responsive to the program routines for determining a predefined single viewing window having a fixed, predetermined size and shape and for accessing the initial representation of the image in the memory and for establishing windowed regions defining ordered patterns of pixels of the initial representation and containing a pixel of the image which is to be assigned a discretely quantized continuous tone value, the processor accessing the initial representation of the image in the and the predetermined ordered patterns of pixels stored in the memory to compare on a pixel by pixel basis the ordered patterns of pixels defined by the windowed regions with the plurality of predetermined ordered patterns of pixels to designate whether windowed regions of the initial representation are dithered, directly assigning the continuous tone value corresponding to the matching one of the plurality of predetermined ordered patterns of pixels to the pixel of the image which is to be assigned a discretely quantized continuous tone value, and generating the pixels of the discretely quantized continuous tone representation of the image by writing the continuous tone values into the memory at locations occupied by the pixels of the discretely quantized continuous tone representation of the image.

11. A data processing system for converting an initial representation of an image including dithered regions and line art regions to a gray scale representation of the image, said initial representation of the image including a plurality of binary data bits, each binary data bit representing a state of a pixel of the image, said data processing system comprising:

a) a memory area for storing the initial representation of the image, program routines for controlling the operation of a processor, and a plurality of predetermined ordered patterns of pixels wherein each predetermined ordered pattern of pixels represents an ordered pattern of pixels generated by applying a dithering dot threshold array to an image area having a uniform continuous tone value of a corresponding one of a plurality of continuous tone values and each one of the continuous tone values corresponds to a matching one of the plurality of predetermined ordered patterns of pixels, wherein the plurality of predetermined ordered patterns of pixels are stored in the memory in a table for storing the plurality of predetermined ordered patterns of pixels and wherein the plurality of predetermined ordered patterns of pixels are generated by applying a dithering dot threshold array to an image area having a uniform continuous tone value of a corresponding one of a plurality of continuous tone values, and wherein the predetermined ordered patterns of pixels are selected for line art such that the processing means will provide an indication that there is no match between the ordered pattern of pixels defined by the window regions and the predetermined ordered patterns of pixels when a window region contain line art; and b) a processor operating under control of the program routines for processing the initial representation of the image to convert the initial representation of the image to a gray scale representation, said processing means operating under control of the program routines for determining a predefined single viewing window having a fixed, predetermined size and shape for establishing windowed regions defining ordered patterns of pixels of the initial representation and containing a pixel of the image which is to be assigned a discretely quantized continuous tone value, for accessing the memory to compare on a pixel by pixel basis an ordered pattern of pixels defined by a windowed region with the plurality of predetermined ordered patterns of pixels held in the memory area to designate whether windowed regions of the initial representation are dithered, for directly assigning the continuous tone value corresponding to the matching one of the plurality of predetermined ordered patterns of pixels held in the memory area to the pixel of the image which is to be assigned a discretely quantized continuous tone value, wherein the processor means is responsive to an indication of no match between an ordered pattern of pixels defined by a window region by directly assigning to the pixel of the image which is to be assigned a discretely quantized continuous tone value a discretely quantized continuous tone value which equals the value of the binary data bit representing the state of the pixel, and for generating the pixel of the discretely quantized continuous tone representation of the image by writing the continuous tone value into the memory at a location occupied by the pixel of the discretely quantized continuous tone representation of the image.

* * * * *